United States Patent
Dei et al.

(10) Patent No.: US 7,957,465 B2
(45) Date of Patent: *Jun. 7, 2011

(54) MOVING PICTURE DATA CODE CONVERSION/TRANSMISSION METHOD AND DEVICE, CODE CONVERSION/RECEPTION METHOD AND DEVICE

(75) Inventors: Hiroaki Dei, Minato-ku (JP); Atsushi Hatabu, Minato-ku (JP); Kazunori Ozawa, Minato-ku (JP)

(73) Assignee: NEC Corporation, Tokyo (JP)

( * ) Notice: Subject to any disclaimer, the term of this patent is extended or adjusted under 35 U.S.C. 154(b) by 1657 days.

This patent is subject to a terminal disclaimer.

(21) Appl. No.: 10/512,458

(22) PCT Filed: Apr. 28, 2003

(86) PCT No.: PCT/JP03/05455
§ 371 (c)(1),
(2), (4) Date: Oct. 26, 2004

(87) PCT Pub. No.: WO03/092296
PCT Pub. Date: Nov. 6, 2003

(65) Prior Publication Data
US 2005/0226325 A1    Oct. 13, 2005

(30) Foreign Application Priority Data
Apr. 26, 2002    (JP) .................................. 2002-126674

(51) Int. Cl.
*H04N 7/12* (2006.01)
(52) U.S. Cl. .......... 375/240.12; 375/240.01; 375/240.25
(58) Field of Classification Search ............. 375/240.12, 375/1, 25
See application file for complete search history.

(56) References Cited

U.S. PATENT DOCUMENTS

| 6,014,694 | A  | * | 1/2000 | Aharoni et al. ............... 709/219 |
| 6,181,711 | B1 |   | 1/2001 | Zhang et al. |
| 6,507,611 | B1 | * | 1/2003 | Imai et al. ..................... 375/222 |
| 6,795,506 | B1 | * | 9/2004 | Zhang et al. ............. 375/240.26 |
| 7,016,337 | B1 | * | 3/2006 | Wu et al. ....................... 370/352 |

(Continued)

FOREIGN PATENT DOCUMENTS

JP    H07-48711 A    5/1995
(Continued)

OTHER PUBLICATIONS

Alasti, M. et al., "Multiple Description Coding in Networks with Congestion Problem", IEEE Transactions on Information Theory, Mar. 2001, vol. 47, Issue 3, pp. 891-902.

(Continued)

*Primary Examiner* — Marsha D Banks Harold
*Assistant Examiner* — Jessica Prince
(74) *Attorney, Agent, or Firm* — Sughrue Mion, PLLC

(57) ABSTRACT

A code conversion/transmission apparatus for being supplied with compressed encoded data and converting and outputting the data to a transmission path has code converter/transmitters for outputting the encoded data input thereto and encoded data produced by re-encoding the encoded data input thereto, or outputting a plurality of encoded data comprising encoded data produced by separately re-encoding the encoded data input thereto, respectively, and transmitting the plurality of encoded data to at least one transmission path. At least a portion of the encoded data input thereto and at least a portion of the re-encoded encoded data are transmitted to the transmission path.

24 Claims, 16 Drawing Sheets

U.S. PATENT DOCUMENTS

| | | | |
|---|---|---|---|
| 7,088,398 B1 * | 8/2006 | Wolf et al. | 348/423.1 |
| 7,103,669 B2 * | 9/2006 | Apostolopoulos | 709/231 |
| 7,180,434 B2 * | 2/2007 | Ozawa et al. | 341/60 |
| 7,391,807 B2 * | 6/2008 | Lin et al. | 375/240.03 |
| 2003/0202579 A1 * | 10/2003 | Lin et al. | 375/240.03 |
| 2004/0218672 A1 * | 11/2004 | Bourne et al. | 375/240.12 |

FOREIGN PATENT DOCUMENTS

| | | |
|---|---|---|
| JP | H10-224746 A | 9/1998 |
| JP | H11-164262 A | 6/1999 |
| JP | 11-177939 A | 7/1999 |
| JP | H11-225161 A | 9/1999 |
| JP | 2001-7786 A | 1/2001 |
| JP | 2001-333094 A | 11/2001 |

OTHER PUBLICATIONS

Comas D. et al., "Rate-Distortion Optimization in a Robust Video Transmission Based on Unbalanced Multiple Description Coding", 2001 IEEE Fourth Workshop on Multimedia Signal Processing, Oct. 2001, pp. 581-586.

* cited by examiner

MOVING PICTURE DATA CODE CONVERSION/TRANSMISSION METHOD AND DEVICE, CODE CONVERSION/RECEPTION METHOD AND DEVICE

TECHNICAL FIELD

The present invention relates to the technology of transmitting code data, and more particularly to a method of and an apparatus for receiving encoded moving picture data, converting the encoded moving picture data into data resistant to data losses and data errors in a transmission path, and transmitting the converted moving picture data, and a method of and an apparatus for receiving and decoding the encoded moving picture data.

BACKGROUND ART

In recent years, processes of compressing moving picture data highly efficiently based on interframe prediction and transmitting the encoded data produced by the highly efficient compression have widely been used as processes of efficiently transmitting moving picture data. According to these processes, predictive parameters obtained by predicting encoded images from chronologically successive frames and predicted residual image data are encoded thereby to reduce the amount of information of highly chronologically correlated moving picture data. The predicted residual image data are highly efficiently compressed by a converting/encoding process and a quantizing process, making it possible to transmit moving picture data in a small transmission band.

One example of such processes is a process using a compression encoding scheme such as MPEG (Moving Picture Expert Group)-1, MPEG-2, or MPEG-4. According to these compression encoding schemes, an input image frame is divided into rectangular areas of constant size, called macroblocks, and an interframe prediction is performed in each of the rectangular areas based on motion compensation, and motion vectors and predicted residual image data that are obtained are processed by two-dimensional discrete cosine transform and quantization to convert compressed signal data into a variable length code.

According to conventional moving picture transmission processes, however, if a transmitted data error or a transmitted packet loss which is in the form of a long burst that cannot be recovered even by an error-correcting code occurs, then the recipient is unable to properly recover the image data of the frame which has suffered the error.

One countermeasure that the recipient can take to protect against such errors is an error concealment process for generating image data in a manner to cover up an error, from image data of frames that exist chronologically before and after the error frame and that have been properly decoded, and image data that exist around the error region within the error frame. However, it is impossible to remove decoded image corruptions even with the error concealment process. Moreover, since the error concealment process relies upon the interframe prediction, an image corruption that has occurred once is propagated to succeeding frames.

When information is distributed by multicasting/broadcasting, data error information or packet loss information of received data cannot be transmitted from the recipient to the sender. If error information is transmitted by return from the recipient to the sender, then the feedback information occupies the band of the communication path.

DISCLOSURE OF THE INVENTION

A first object of the present invention is to provide a method of and an apparatus for transmitting image data so as to be able to cover up, to a hardly noticeable level, a significant corruption of a decoded image at the recipient which has been caused by a transmission error of encoded data.

A second object of the present invention is to provide a method of and an apparatus for allowing the user to set a tradeoff between the transmission band which can be used for image data transmission and the quality of images.

A third object of the present invention is to provide a method of and an apparatus for preventing the amount of calculations required to decode compressed encoded data from increasing.

A fourth object of the present invention is to provide a method of and an apparatus for transmitting image data so as to be able to cover up, to a hardly noticeable level, a significant corruption of a decoded image at the recipient which has been caused by a transmission error of encoded data, without sending feedback information from the recipient to the sender.

A code conversion/transmission apparatus according to the present invention is supplied with compressed encoded data and converts and outputs the data to a transmission path, the code conversion/transmission apparatus comprising code converting/transmitting means for transmitting a plurality of encoded data comprising the encoded data input thereto and/or encoded data produced by re-encoding the encoded data input thereto to at least one transmission path. The code conversion/transmission apparatus transmits at least a portion of the encoded data input thereto and the re-encoded encoded data to the transmission path.

A code conversion/reception apparatus according to the present invention receives the encoded data transmitted from the above code conversion/transmission apparatus to the transmission path, the code conversion/reception apparatus comprising means for selecting a transmission path for receiving data and means for receiving encoded data from the selected transmission path and reconstructing encoded data based on encoded data which have been received normally.

A system according to the present invention has the above code conversion/transmission apparatus and a plurality of the above code conversion/reception apparatus, and may have such a system arrangement that the code conversion/transmission apparatus receives encoded data transmitted from an apparatus for distributing encoded data, and the code conversion/reception apparatus receive encoded data.

A code conversion/transmission apparatus for moving picture data according to another aspect of the present invention comprises:

(a) first moving picture code converting/transmitting means for being supplied with compressed encoded data input thereto and outputting at least one frame of the input encoded data;

(b) second to $N^{th}$ moving picture code converting/transmitting means, where N is an integer of 2 or more, for decoding at least a portion of the input encoded data, encoding the data obtained by the decoding, and outputting at least one frame of the encoded data thus obtained; and (c) means for sending at least one of outputs from the first to $N^{th}$ moving picture code converting/transmitting means to first to $M^{th}$ transmission paths, where M is an integer of 1 or more.

A code conversion/reception apparatus for moving picture data according to another aspect of the present invention, which is a reception apparatus for receiving encoded data from the above code conversion/transmission apparatus, comprises:

(d) selecting means for selecting a transmission path for receiving encoded data from the above first to $M^{th}$ transmission paths; and (e) means for receiving encoded data from the transmission path selected by the selecting means, extracting encoded data which are received free of transmission errors and losses, and reconstructing encoded data based on the extracted encoded data and outputting the reconstructed encoded data.

A code conversion/transmission apparatus for moving picture data according to still another aspect of the present invention comprises:

(a) first moving picture code converting/transmitting means for being supplied with compressed encoded packet data input thereto and outputting at least a portion of the input encoded packet;

(b) second to $N^{th}$ moving picture code converting/transmitting means, where N is an integer of 2 or more, for decoding at least a portion of the input encoded packet data, encoding the data obtained by the decoding, and outputting at least a portion of the packet data thus obtained; and (c) means for sending at least one of outputs from the first to $N^{th}$ moving picture code converting/transmitting means to first to $M^{th}$ transmission paths, where M is an integer of 1 or more.

A code conversion/reception apparatus for moving picture data according to still another aspect of the present invention, which is a reception apparatus for receiving encoded data from the above code conversion/transmission apparatus, comprises:

(d) selecting means for selecting a transmission path for receiving encoded data from the above first to $M^{th}$ transmission paths; and (e) means for receiving encoded data from the transmission path selected by the selecting means, extracting encoded packet data which are received free of transmission errors and losses, and reconstructing encoded packet data based on the extracted encoded packet data, and outputting the reconstructed encoded packet data.

A code conversion/transmission method for moving picture data according to further another aspect of the present invention, which is carried out by a code conversion/transmission apparatus having first to $N^{th}$ moving picture code converting/transmitting means, where N is an integer of 2 or more, comprises the steps of:

(a) causing the first moving picture code converting/transmitting means to be supplied with compressed encoded data input thereto and output at least one frame of the input encoded data;

(b) causing the second to $N^{th}$ moving picture code converting/transmitting means to decode at least a portion of the input encoded data, encode the data obtained by the decoding, and outputting at least one frame of the encoded data thus obtained; and (c) sending at least one of outputs from the first to $N^{th}$ moving picture code converting/transmitting means to first to $M^{th}$ transmission paths, where M is an integer of 1 or more.

A reception method according to further another aspect of the present invention comprises the steps of: selecting at least one path from M transmission paths where M is an integer of 1 or more, and receiving encoded data from the selected transmission path, extracting encoded data which are received free of transmission errors and losses, and reconstructing encoded data based on the extracted encoded data and outputting the reconstructed encoded data.

A computer program according to yet further another aspect of the present invention enables a computer, which serves as a code conversion/transmission apparatus for moving picture data, to function as:

(a) first moving picture code converting/transmitting means for being supplied with compressed encoded data input thereto and outputting at least one frame of the input encoded data;

(b) second to $N^{th}$ moving picture code converting/transmitting means, where N is an integer of 2 or more, for decoding at least a portion of the input encoded data, encoding the data obtained by the decoding, and outputting at least one frame of the encoded data thus obtained; and (c) means for sending at least one of outputs from the first to $N^{th}$ moving picture code converting/transmitting means to first to $M^{th}$ transmission paths, where M is an integer of 1 or more, so that the computer performs a code conversion/transmission process for moving picture data.

A computer program refers to a program which is embodied on a computer-readable recording medium. The computer program may be executed by a computer and enable the computer to perform desired processes or to generally function as desired, as is described in the exemplary embodiments.

A computer program according to another aspect of the present invention enables a computer, which serves as a code conversion/reception apparatus for moving picture data, to perform a code conversion/transmission process for moving picture data, the program enabling the computer to perform a process of selecting at least one transmission path of M transmission paths where M is an integer of 1 or more, and a process of receiving encoded data from the selected transmission path, extracting encoded data which are received free of transmission errors and losses, and reconstructing encoded data based on the extracted encoded data and outputting the reconstructed encoded data.

According to the present invention, in order to prevent decoded images from being significantly corrupted due to a transmission error of compressed encoded moving picture data, the code conversion/transmission apparatus receives encoded data from a moving picture encoding apparatus (server apparatus) serving as an information source, converts the encoded data into a form resistant to data losses and data errors over transmission paths, and transmits the converted data to the code conversion/reception apparatus side.

According to the present invention, the code conversion/transmission apparatus has first to $N^{th}$ code converting/transmitting means where N is an integer of 2 or more, and transmitting means of those code converting/transmitting means for first to $M^{th}$ transmitting paths where M is an integer of 1 or more. The code conversion/transmission apparatus compresses moving picture data into N encoded data and transmits the encoded data. The code conversion/reception apparatus side selects and decodes encoded data of good image quality, which has the lowest compression ratio, for example, from the encoded data that are received normally from at least one transmission path among the M transmission paths.

According to the present invention, the N encoded data obtained by the first to $N^{th}$ code converting/transmitting means are transmitted with constant or adaptively changing time differences. For example, the code conversion/reception apparatus side which serves as a client terminal selects encoded data of good image quality, which has the lowest compression ratio, for example, in terms of frames or packets from the encoded data that are received normally from at least one transmission path of the M transmission paths. The encoded data from the code conversion/reception apparatus are transferred to a decoding apparatus (decoder), which decodes the encoded data.

According to the present invention, compression ratios of the first to $N^{th}$ moving picture code converting/transmitting means and/or the number of encoded data to be transmitted can be selected depending on transmission bands that can be used by the first to $M^{th}$ transmission paths. The second to $N^{th}$ moving picture code converting/transmitting means can encode data at a compression ratio equal to or higher than the first moving picture code converting/transmitting means, or the compression ratio can be set to any value.

According to the present invention, in order to prevent the amount of calculations on the reception side from being increased due to the transmission of a plurality of encoded data, the code conversion/transmission apparatus generates encoded data including the same frame or the same image area, and the reception side selects at least one frame or the encoded data in a unit of packet from the plurality of encoded data that are received, and decodes the selected data.

More specifically, in the apparatus according to the present invention, a code conversion/transmission apparatus, where N represents an integer of 2 or more and M represents an integer of 1 or more, comprises:

a) first moving picture code converting/transmitting means for being supplied with compressed encoded data and controlling transmission, with a predetermining transmitting means, of all the frames or frames which have adaptively been selected according to the nature of the input moving picture or predetermined rules;

b) second to $N^{th}$ moving picture code converting/transmitting means for decoding at least a portion of the input encoded data, performing compression encoding of the data at a compression ratio equal to or higher than first moving picture code converting/transmitting means, and controlling transmission, with predetermined transmitting means, of all the frames of the encoded data that are obtained or frames which have adaptively been selected according to the nature of the input moving picture or predetermined rules, with constant or adaptively changing transmission time differences; and c) means for selecting compression ratios of first to $N^{th}$ moving picture code converting/transmitting means and/or the number of encoded data to be transmitted depending on bands that can be used by first to $M^{th}$ transmission paths, and transmitting the encoded data to the first to $M^{th}$ transmission paths.

The code conversion/reception apparatus comprises selecting means for selecting at least one transmission path from the M transmission paths, receiving N encoded data from the selected transmission path, extracting encoded data that are received free of transmission errors or losses, and selecting and outputting encoded moving picture data of good image quality, which has the lowest compression ratio, for example, from the encoded data in the same frame.

In an apparatus according to a second aspect of the present invention, a code conversion/transmission apparatus, where N represents an integer of 2 or more and M represents an integer of 1 or more, comprises:

(a) first moving picture code converting/transmitting means for being supplied with compressed encoded packet data and controlling transmission, with predetermining transmitting means, of all the packets or packets which have adaptively been selected according to the nature of the input moving picture or predetermined rules;

(b) second to $N^{th}$ moving picture code converting/transmitting means for decoding at least a portion of the input encoded packet data, performing compression encoding of the data into one packet data including the same image area as the received packet data at a compression ratio equal to or higher than the first moving picture code converting/transmitting means, and controlling transmitting, with predetermined transmitting means, all the packet data that are obtained or packet data which have adaptively been selected according to the nature of the input moving picture or predetermined rules, with constant or adaptively changing transmission time differences; and (c) means for selecting compression ratios of first to $N^{th}$ moving picture code converting/transmitting means and/or the number of encoded data to be transmitted depending on bands that can be used by first to $M^{th}$ transmission paths, and transmitting the encoded data to the first to $M^{th}$ transmission paths.

The code conversion/reception apparatus comprises selecting means for selecting at least one transmission path from the M transmission paths, receiving N encoded data from the selected transmission path, and selecting and outputting packet data of good image quality, which has the lowest compression ratio, for example, from the packet data that are received free of transmission errors or losses, which have been produced by encoding an image in the same area of the same frame.

In an apparatus according to a third aspect of the present invention, a code conversion/transmission apparatus side, where N represents an integer of 2 or more and M represents an integer of 1 or more, comprises:

(a) first moving picture code converting/transmitting means for being supplied with compressed encoded data, performing compression encoding of all the frames of decoded moving picture data or frames which have adaptively been selected according to the nature of the input moving picture or predetermined rules at a compression ratio equal to or higher than the input encoded data, and controlling transmission, with predetermining transmitting means, of at least a portion of the encoded data thus obtained;

(b) second to $N^{th}$ moving picture code converting/transmitting means for encoding all the frames encoded by the first moving picture code converting/transmitting means or frames which have adaptively been selected according to the nature of the input moving picture or predetermined rules at a compression ratio equal to or higher than the first moving picture code converting/transmitting means, re-using at least one of interframe predictive parameters and predicted differential image data that are obtained by an interframe prediction performed on that frame by the first moving picture code converting/transmitting means, and controlling transmission of the obtained encoded data with constant or adaptively changing transmission time differences, with predetermined transmitting means; and (c) means for selecting compression ratios of first to $N^{th}$ moving picture code converting/transmitting means and/or the number of encoded data to be transmitted depending on bands that can be used by first to $M^{th}$ transmission paths, and transmitting the encoded data to the first to $M^{th}$ transmission paths.

The code conversion/reception apparatus comprises selecting means for selecting at least one transmission path from the M transmission paths, receiving N encoded data from the selected transmission path, extracting encoded data which have been received free of transmission errors or losses, and selecting and outputting encoded moving picture data of good image quality, which has the lowest compression ratio, for example, from the encoded data in the same frame.

In an apparatus according to a fourth aspect of the present invention, a code conversion/transmission apparatus, where N represents an integer of 2 or more and M represents an integer of 1 or more, comprises:

(a) first moving picture code converting/transmitting means for decoding at least a portion of encoded packet data input thereto, performing compression encoding the decoded data at a compression ratio equal to or higher than the input moving picture data, and controlling transmission, with predetermining transmitting means, of at least a portion of the encoded packet data thus obtained;

(b) second to $N^{th}$ moving picture code converting/transmitting means for encoding an image area, which is encoded by each of all the packet data encoded by the first moving picture code converting/transmitting means or packet data which have adaptively been selected according to the nature of the input moving picture or predetermined rules, into one packet data, which includes the same image area as the packet data, at a compression ratio equal to or higher than the first moving picture code converting/transmitting means, re-using at least one of interframe predictive parameters and predicted differential image data that are obtained by an interframe prediction performed on that image area by the first moving picture code converting/transmitting means, and controlling transmission of the obtained encoded packet data with constant or adaptively changing transmission time differences, with predetermined transmitting means; and (c) means for selecting compression ratios of first to $N^{th}$ moving picture code converting/transmitting means and/or the number of encoded data to be transmitted depending on bands that can be used by first to $M^{th}$ transmission paths, and transmitting the encoded data to the first to $M^{th}$ transmission paths.

The code conversion/reception apparatus side comprises selecting means for selecting at least one transmission path from the M transmission paths, receiving N encoded data from the selected transmission path, and selecting and outputting packet data of good image quality, which has the lowest compression ratio, for example, from the packet data that are received free of transmission errors or losses, which have been produced by encoding an image in the same area of the same frame.

In an apparatus according to a fifth aspect of the present invention, a code conversion/transmission apparatus, where N represents an integer of 2 or more and M represents an integer of 1 or more, comprises:

(a) first moving picture code converting/transmitting means for being supplied with compressed encoded data, performing compression encoding of all the frames of decoded moving picture data or frames which have adaptively been selected according to the nature of the input moving picture or predetermined rules at a compression ratio equal to or higher than the received encoded data, and controlling transmission, with predetermining transmitting means, of at least a portion of the encoded data thus obtained;

(b) second to $N^{th}$ moving picture code converting/transmitting means for encoding all the frames re-encoded by the first moving picture code converting/transmitting means or frames which have adaptively been selected according to the nature of the input moving picture or predetermined rules at a compression ratio equal to or higher than the first moving picture code converting/transmitting means, using a reference frame image used in an interframe prediction performed on that frame by the first moving picture code converting/transmitting means, and controlling transmission of at least a portion of the obtained encoded data with constant or adaptively changing transmission time differences, with predetermined transmitting means; and (c) means for selecting compression ratios of first to $N^{th}$ moving picture code converting/transmitting means and/or the number of encoded data to be transmitted depending on bands that can be used by first to $M^{th}$ transmission paths, and transmitting the encoded data to the first to $M^{th}$ transmission paths.

The code conversion/reception apparatus side comprises selecting means for selecting at least one transmission path from the M transmission paths, receiving N encoded data from the selected transmission path, extracting encoded data which have been received free of transmission errors or losses, and selecting and outputting encoded moving picture data of good image quality, which has the lowest compression ratio, for example, from the encoded data in the same frame.

In an apparatus according to a sixth aspect of the present invention, a code conversion/transmission apparatus, where N represents an integer of 2 or more and M represents an integer of 1 or more, comprises:

(a) first moving picture code converting/transmitting means for being supplied with compressed encoded packet data, performing compression encoding of decoded moving picture data at a compression ratio equal to or higher than the input moving picture data, and controlling transmission, with a predetermining transmitting means, of at least a portion of the encoded packet data thus obtained;

(b) second to $N^{th}$ moving picture code converting/transmitting means for encoding an image area, which is encoded by each of all the packet data encoded by the first moving picture code converting/transmitting means or packet data which have adaptively been selected according to the nature of the input moving picture or predetermined rules, into one packet data, which includes the same image area as the packet data, at a compression ratio equal to or higher than the first moving picture code converting/transmitting means, using a reference frame image that is used in an interframe prediction performed on that image area by the first moving picture code converting/transmitting means, and controlling transmission of the obtained packet data with constant or adaptively changing transmission time differences, with predetermined transmitting means; and (c) means for selecting compression ratios of first to $N^{th}$ moving picture code converting/transmitting means and/or the number of encoded data to be transmitted depending on bands that can be used by first to $M^{th}$ transmission paths, and transmitting the encoded data to the first to $M^{th}$ transmission paths.

The code conversion/reception apparatus comprises selecting means for selecting at least one transmission path from the M transmission paths, receiving N encoded data from the selected transmission path, and selecting and outputting packet data of good image quality, which has the lowest compression ratio, for example, from the packet data that are received free of transmission errors or losses, which have been produced by encoding an image in the same area of the same frame.

In an apparatus according to a seventh aspect of the present invention, a code conversion/transmission apparatus, where N represents an integer of 2 or more and M represents an integer of 1 or more, comprises:

(a) first moving picture code converting/transmitting means for being supplied with encoded packet data and controlling transmission of the data with predetermined transmitting means;

(b) second to $N^{th}$ moving picture code converting/transmitting means for duplicating packets of all the frames encoded by the first moving picture code converting/transmitting means or packet data which have adaptively been selected according to the nature of the input moving picture or predetermined rules, and controlling transmission of least a portion of the obtained packet data with constant or adaptively changing transmission time differences, with predetermined transmitting means; and (c) means for selecting the number of encoded data to be transmitted of the first to $N^{th}$ moving picture code converting/transmitting means depending on bands that can be used by first to $M^{th}$ transmission paths, and transmitting the encoded data to the first to $M^{th}$ transmission paths.

The code conversion/reception apparatus comprises selecting means for selecting at least one transmission path from the M transmission paths, receiving N encoded data from the selected transmission path, and selecting and outputting packet data of good image quality, which has the lowest compression ratio, for example, from the packet data that are received free of transmission errors or losses, which have been produced by encoding an image in the same area of the same frame.

In an apparatus according to an eighth aspect of the present invention, a code conversion/transmission apparatus, where N represents an integer of 2 or more and M represents an integer of 1 or more, comprises:

(a) first moving picture code converting/transmitting means for being supplied with compressed encoded data, decoding at least a portion of the input encoded data, performing compression encoding of the data at a compression ratio equal to or higher than the input moving picture data, and controlling transmission, with predetermining transmitting means, of all the frames or frames which have adaptively been selected according to the nature of the input moving picture or predetermined rules;

(b) second to $N^{th}$ moving picture code converting/transmitting means for decoding at least a portion of the input encoded data, compressing the data at a compression ratio equal to or higher than the first moving picture code converting/transmitting means, and controlling transmission of all the frames of the encoded data that are obtained or frames which have adaptively been selected according to the nature of the input moving picture or predetermined rules, with constant or adaptively changing transmission time differences, with predetermining transmitting means; and (c) means for selecting compression ratios of first to $N^{th}$ moving picture code converting/transmitting means and/or the number of encoded data to be transmitted depending on bands that can be used by first to $M^{th}$ transmission paths, and transmitting the encoded data to the first to $M^{th}$ transmission paths.

The code conversion/reception apparatus side comprises selecting means for selecting at least one transmission path from the M transmission paths, receiving N encoded data from the selected transmission path, extracting encoded data that are received free of transmission errors or losses, and selecting and outputting encoded moving picture data of good image quality, which has the lowest compression ratio, for example, from the encoded data in the same frame.

In an apparatus according to a ninth aspect of the present invention, a code conversion/transmission apparatus, where N represents an integer of 2 or more and M represents an integer of 1 or more, comprises:

(a) first moving picture code converting/transmitting means for being supplied with compressed encoded packet data, decoding at least a portion of the encoded packet data input thereto, performing compression encoding of data at a compression ratio equal to or higher than the input encoded data, and controlling transmission, with a predetermining transmitting means, of all the packets or packets which have adaptively been selected according to the nature of the input moving picture or predetermined rules;

(b) second to $N^{th}$ moving picture code converting/transmitting means for decoding at least a portion of the input encoded packet data, performing compression encoding of the data into one packet data including the same image area as the received packet data at a compression ratio equal to or higher than the first moving picture code converting/transmitting means, and controlling transmission, with predetermined transmitting means, of all the packet data that are obtained or packet data which have adaptively been selected according to the nature of the input moving picture or predetermined rules, with constant or adaptively changing transmission time differences; and (c) means for selecting compression ratios of first to $N^{th}$ moving picture code converting/transmitting means and/or the number of encoded data to be transmitted depending on bands that can be used by first to $M^{th}$ transmission paths, and transmitting the encoded data to the first to $M^{th}$ transmission paths.

The code conversion/reception apparatus comprises selecting means for selecting at least one transmission path from the M transmission paths, receiving N encoded data from the selected transmission path, and selecting and outputting packet data of good image quality, which has the lowest compression ratio, for example, from the packet data that are received free of transmission errors or losses, which have been produced by encoding an image in the same area of the same frame.

According to the present invention, the code conversion/transmission apparatus may have first to $M^{th}$ code conversion/transmission processors each having first to $N^{th}$ moving picture code converting/transmitting means, where M is an integer of 1 or more, wherein encoded data outputs of the first to $N^{th}$ moving picture code converting/transmitting means of the first to $M^{th}$ code conversion/transmission processors may be sent respectively to the first to $M^{th}$ transmission paths.

Alternatively, according to the present invention, the code conversion/transmission apparatus may have first to $M^{th}$ code conversion/transmission processors each having first to $N^{th}$ moving picture code converting/transmitting means, where M is an integer of 1 or more, each of the first to $M^{th}$ code conversion/transmission processors having means for multiplexing and outputting first to $N^{th}$ encoded data outputs of the first to $N^{th}$ moving picture code converting/transmitting means with time differences.

A system according to the present invention has an encoding apparatus of moving picture data, a code conversion/transmission apparatus according to any one of the above aspects, a plurality of code conversion/reception apparatus according to any one of the above aspects, and a plurality of decoding apparatus (decoders) corresponding to the code conversion/reception apparatus, wherein the encoded data from the encoding apparatus are input to the code conversion/transmission apparatus, the plurality of code conversion/reception apparatus are supplied with the output from the code conversion/transmission apparatus, and the plurality of decoding apparatus are supplied with and decode encoded data from the code conversion/reception apparatus.

The present invention has advantages that, even if transmission paths which tend to suffer transmission errors and packet losses of highly burst nature and are low in reliability are employed, the probability that all of a plurality of encoded data of original and duplicated packets are transmitted in error is reduced, efficiently preventing a decoded image produced from being corrupted even when the occurrence of a packet loss. The reasons for the advantages are as follows:

According to the present invention, the code conversion/transmission apparatus side has first to $N^{th}$ moving picture code converting/transmitting means on first to $M^{th}$ transmission paths where N is an integer of 2 or more and M is an integer of 1 or more. The first moving picture code converting/transmitting means transmits at least one frame or packet of moving picture data at a transmission rate, or decodes and thereafter performs compression encoding of moving picture data into N encoded data, and transmits the data with constant or adaptively changing time differences. The second to $N^{th}$ moving picture code converting/transmitting means encode a frame input thereto using at least one of interframe predictive parameters or predicted residual image data obtained by the encoding of the frame with the first moving picture code converting/transmitting means, or a reference frame image used in the first code converting/transmitting means. The code conversion/reception apparatus side selects and decodes, in terms of frames or packets, encoded data of good image quality, which has the lowest compression ratio, for example, from the encoded data that are received normally from at least one transmission path among the M transmission paths.

According to the present invention, compression ratios of the first to $N^{th}$ moving picture code converting/transmitting means and/or the number of encoded data to be transmitted can be selected depending on bands that can be used by the first to $M^{th}$ transmission paths for the transmission of moving picture data. The moving picture data can thus be transmitted depending on the condition of the transmission paths or the intention of the sender of moving picture data.

According to the present invention, the second to $N^{th}$ moving picture code converting/transmitting means performs encoding at a compression ratio equal to or higher than the first moving picture code converting/transmitting means, and can perform transmission control of encoded data with respect to only a portion of a frame or an image area encoded by the first moving picture code converting/transmitting means. Therefore, the transmission rate is prevented from being increased due to the transmission of a plurality of encoded data.

According to the present invention, furthermore, the code conversion/transmission apparatus side generates encoded data including the same frame or the same image area, and the code conversion/reception apparatus side selects and decodes frames or packets of one of a plurality of encoded data that are received. Consequently, since the reception side may decode at least one data of two received encoded data for the purpose of decoding the same frame or the same image area, an increase in the amount of calculations required by the reception side is reduced.

Moreover, according to the present invention, since the code conversion/transmission apparatus can reduce a significant corruption of a decoded image which has been caused by a transmission error of encoded data, to a hardly visually recognizable level, without using feedback information from the code conversion/reception apparatus side, the traffic does not suffer an increase which would otherwise occur for the transmission of feedback information, and the code conversion/transmission apparatus and the code conversion/reception apparatus can be simplified in arrangement.

BEST MODE FOR CARRYING OUT THE INVENTION (1) First Embodiment

Figure 1:
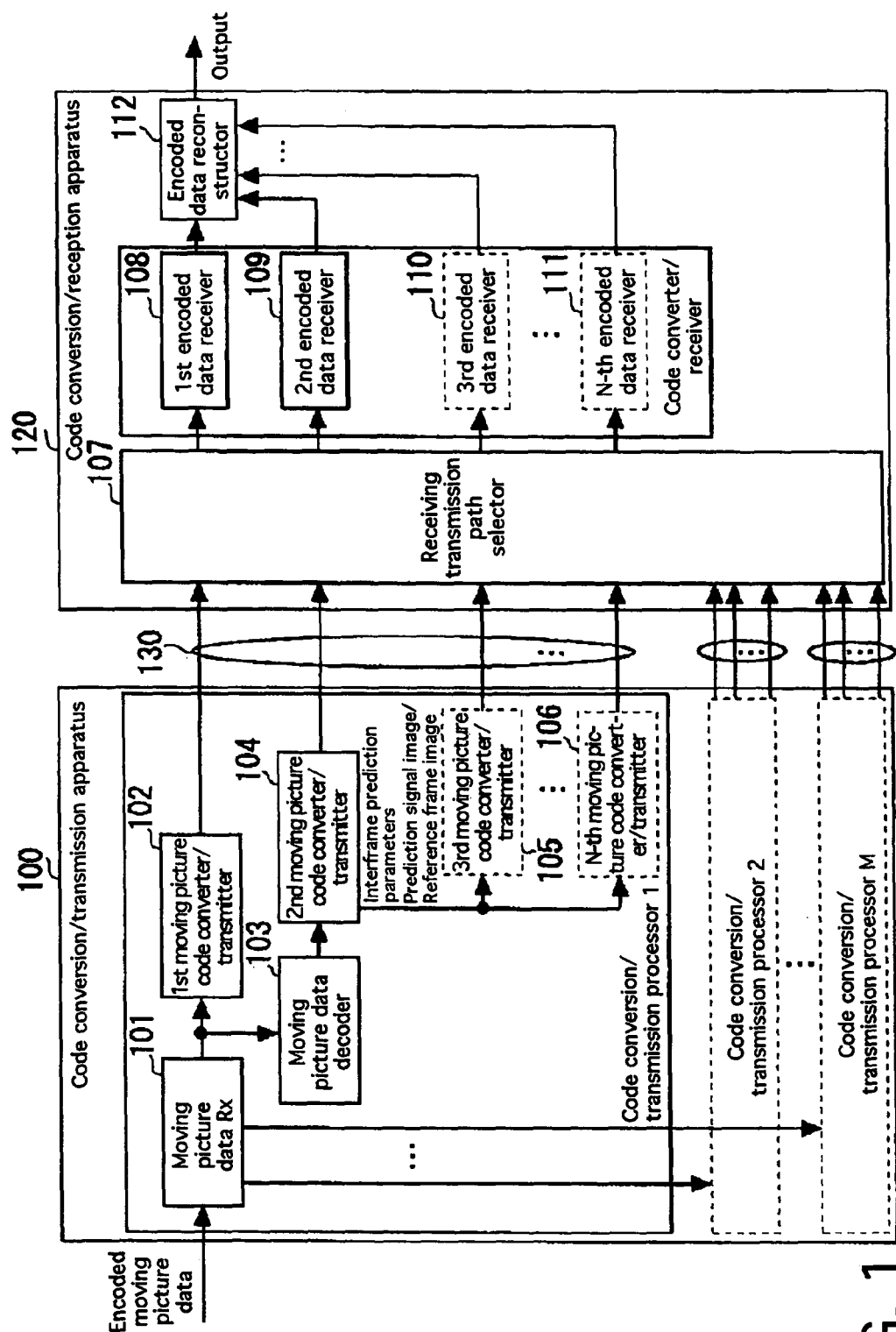
FIG. 1 is a block diagram illustrating an arrangement of a code conversion/transmission system according to first and second embodiments of the present invention.

According to a first embodiment of the present invention, as shown in FIG. 1, code conversion/transmission apparatus 100, where N represents an integer of 2 or more and M represents an integer of 1 or more, has:

a) first moving picture code converter/transmitter 102 for being supplied with compressed encoded data and controlling transmission, with a predetermining transmitting means, of all the frames or frames which have adaptively been selected according to the nature of the input moving picture or predetermined rules;

b) second to $N^{th}$ moving picture code converter/transmitters 104 to 106 for decoding at least a portion of the input encoded data, performing compression encoding of the data at a compression ratio equal to or higher than first moving picture code converter/transmitter 102, and controlling transmission, with a transmitting means which is the same as or different from first moving picture code converter/transmitter 102, of all the frames of the encoded data that are obtained or frames which have adaptively been selected according to the nature of the input moving picture or predetermined rules, with constant or adaptively changing time differences; and c) a mechanism for selecting compression ratios of first to $N^{th}$ moving picture code converter/transmitters and/or the number of encoded data to be transmitted depending on bands that can be used by first to $M^{th}$ transmission paths, and transmitting the encoded data to the first to $M^{th}$ transmission paths.

Code conversion/reception apparatus 120 comprises receiving transmission path selector 107 for selecting at least one transmission path from the M transmission paths, encoded data receivers 108 to 111 for receiving N encoded data from the selected transmission path, and extracting encoded data that are received free of transmission errors or losses, and encoded data reconstructor 112 for selecting and outputting encoded moving picture data of good image quality, which has the lowest compression ratio, for example, from the encoded data in the same frame. The components of code conversion/transmission apparatus 100 and code conversion/reception apparatus 120 have their processing and function realized by a program that is executable by a computer serving as the code conversion/transmission apparatus and the code conversion/reception apparatus.

The first embodiment will be described in greater detail below:

(1. A) General:

FIG. 1 is a diagram showing an arrangement of the first embodiment of the present invention. As shown in FIG. 1, the first embodiment comprises code conversion/transmission apparatus 100 for moving picture data, code conversion/reception apparatus 120, and transmission paths 130 for transmitting encoded data. The integer N represents the number of encoded data transmitted by code conversion/transmission apparatus 100, and is 2 or more. The integer M represents the number of transmission paths to which N encoded data are sent, and is 1 or more. Code conversion/transmission apparatus 100 and code conversion/reception apparatus 120 are also referred to as moving picture code conversion/transmission apparatus and moving picture code conversion/reception apparatus, respectively.

Code conversion/transmission apparatus 100 is supplied with moving picture data from an encoding apparatus (not shown in FIG. 1, see encoding apparatus 40 in FIG. 16, for example), encodes the input moving picture data into N encoded data, and transmits the N encoded data as first to $N^{th}$ encoded moving picture data to first to $M^{th}$ (M represents an integer or 1 or more) transmission paths 130. As shown in FIG. 1, code conversion/transmission apparatus 100 has M code conversion/transmission processors 1 to M corresponding respectively to first to $M^{th}$ transmission paths 130. Code conversion/transmission processors 1 to M transmit encoded data respectively to corresponding first to $M^{th}$ transmission paths 130.

Each of code conversion/transmission processors 1 to M has first to $N^{th}$ N moving picture code converter/transmitters 102, 104 to 106, and outputs first to $N^{th}$ encoded data. Code conversion/transmission processors 2 to M are identical in arrangement to code conversion/transmission processor 1 except that they are supplied commonly with the encoded data that have been received by code conversion/transmission processor 1. For the sake of brevity, FIG. 1 shows the arrangement of code conversion/transmission processor 1 only. Code conversion/transmission processor 1 will be described below, and the description of code conversion/transmission processors 2 to M will be omitted.

Moving picture data receiver 101 in code conversion/transmission processor 1 receives encoded moving picture data. The encoded moving picture data received by moving picture data receiver 101 of code conversion/transmission processor 1 is also supplied to code conversion/transmission processors 2 to M.

First moving picture code converter/transmitter 102 sends at least a portion of frames of the input moving picture data to moving picture code conversion/reception apparatus 120. The input moving picture data are decoded by moving picture data decoder 103.

Second moving picture code converter/transmitter 104 performs compression encoding of a moving picture obtained by moving picture data decoder 103 at a compression ratio equal to or higher than the first encoded moving picture data, and sends at least a portion of the encoded data to moving picture code conversion/reception apparatus 120.

If N is 3 or more, third to $N^{th}$ moving picture code converter/transmitters 105, 106 encode at least one of the frames encoded by first moving picture code converter/transmitter 102, at a compression ratio equal to or higher than second moving picture code converter/transmitter 104, using at least one of interframe predictive parameters and predicted differential image data that are obtained by an interframe prediction performed on that frame by second moving picture code converter/transmitter 104, and sends at least a portion of the encoded data that are obtained to moving picture code conversion/reception apparatus 120.

The first to $N^{th}$ encoded moving picture data from code conversion/transmission processors 1 to M are sent to first to $M^{th}$ transmission paths 130. Depending on the bands that can be used by first to $M^{th}$ transmission paths 130, control for selecting the compression ratios of the first to $N^{th}$ moving picture code converter/transmitters and/or the number of encoded data to be transmitted and transmitting data to first to $M^{th}$ transmission paths 130 may be performed. Rather than the plural code conversion/transmission processors 1 to M are employed in parallel to each other, the outputs of the first to $N^{th}$ moving picture code converter/transmitters of one code conversion/transmission processor 1 may be distributed to first to $M^{th}$ transmission paths 130. Alternatively, the output paths of code conversion/transmission processors 1 to M may be switched from one to another, and the connections of first to $M^{th}$ transmission paths 130 may be switched from one to another.

In moving picture code conversion/reception apparatus 120, receiving transmission path selector 107 selects at least one transmission path from the M transmission paths to which the code conversion/transmission apparatus has sent encoded data. Code conversion/reception apparatus 120 receives N encoded data from the selected transmission path, and decodes and converts the encoded data.

As shown in FIG. 1, the encoded data from the transmission path selected by receiving transmission path selector 107 is received by a code conversion receiver. The code conversion receiver comprises first to $N^{th}$ encoded data receivers 108 to 111 which receive encoded data transmitted by the first to $N^{th}$ moving picture code converter/transmitters of the code conversion/transmission apparatus.

The moving picture code conversion/reception apparatus has encoded data reconstructor 112 for being supplied with outputs from first to $N^{th}$ encoded data receivers 108 to 111 of the code conversion receiver.

Encoded data reconstructor 112 selects and outputs encoded moving picture data of good image quality, which has the lowest compression ratio, for example, from a maximum of N encoded data that are received free of transmission errors or losses by first to $N^{th}$ encoded data receivers 108 to 111. Alternatively, encoded data reconstructor 112 may select encoded data, such as encoded data that have been received normally at first, from a maximum of N encoded data that are received, according to a predetermined decision criterion different from the compression ratio, thereby to reconstruct encoded moving picture data. The encoded data reconstructed by encoded data reconstructor 112 is supplied to a decoding apparatus (not shown), which performs decoding process of the supplied encoded data.

Figure 2:
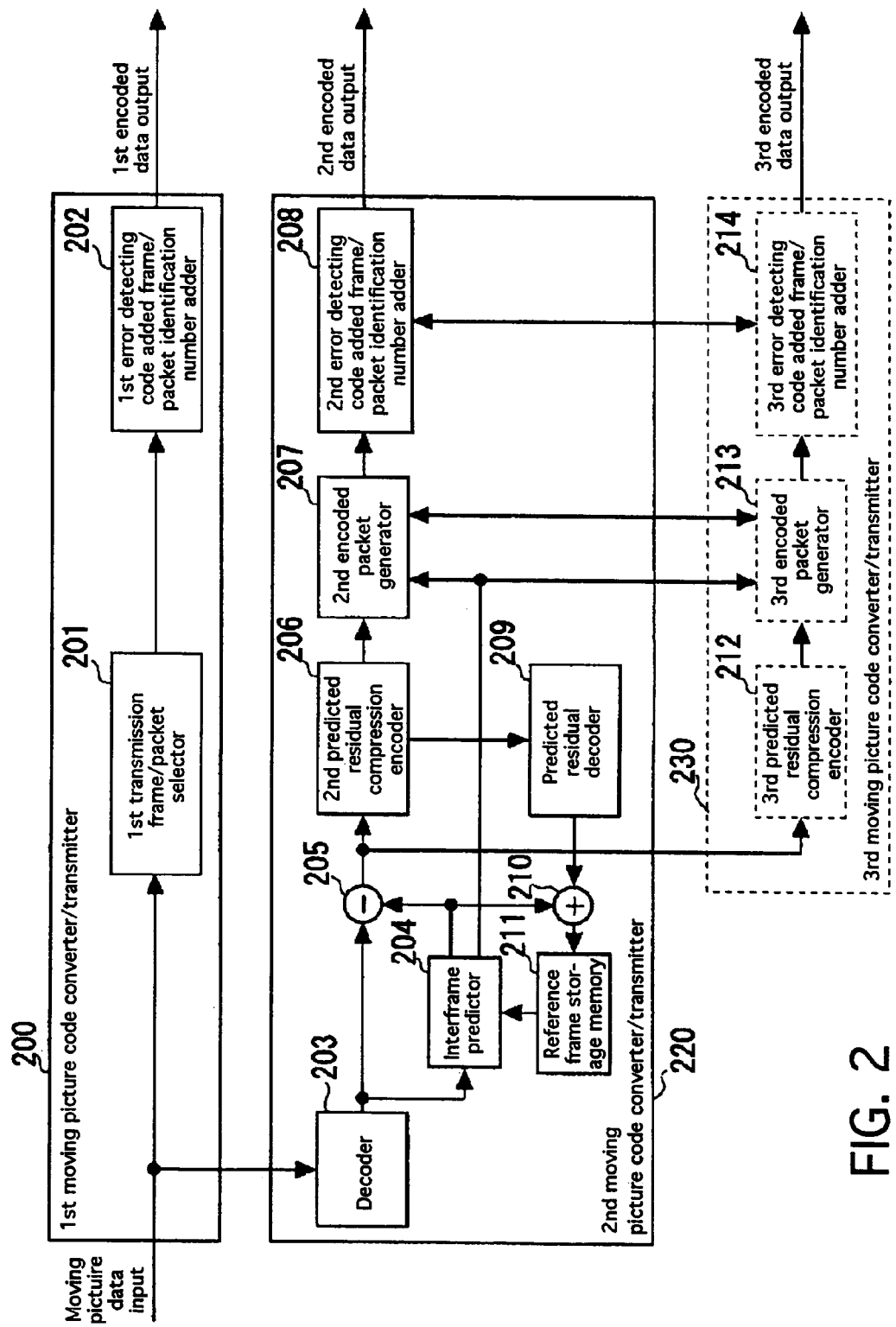
FIG. 2 is a block diagram illustrating an arrangement of a moving picture code conversion/transmission apparatus in the system shown in FIG. 1.

(1. B) Code Conversion/Transmission Apparatus:

FIG. 2 shows a detailed arrangement of a moving picture code conversion/transmission apparatus according to the first embodiment of the present invention. For the sake of brevity, it is assumed that the number N of encoded data output from this apparatus is 3 and the number M of transmission paths for transmitting encoded data is 2.

In FIG. 2, first moving picture encoder/transmitter 200 has first transmission frame/packet selector 201 and first error detecting code added frame/packet identification number adder 202. First moving picture encoder/transmitter 200 corresponds to first moving picture code converter/transmitter 102 shown in FIG. 1.

First transmission frame/packet selector 201 adaptively selects a frame to be transmitted to a transmission path depending on the property of images and the situation of transmission paths, from moving picture frames that are input thereto. For example, first transmission frame/packet selector 201 may select and output a packet in each constant period (once per n packets). Alternatively, first transmission frame/packet selector 201 refers to a characteristic parameter in packets of moving picture frames, and adaptively determines selected and encoded packets to be transmitted. For example, first transmission frame/packet selector 201 may refer to a parameter, e.g., a motion vector, which largely affects the quality of decoded images due to a bit error or a packet loss, as a characteristic parameter in encoded packets, and adaptively determines encoded packets to be transmitted. Alternatively, if the encoding process is an MPEG process, then first transmission frame/packet selector 201 may employ a rule according to a picture type, such as a rule for necessarily selecting an I picture, for example, and may dynamically change such a selecting rule.

First error detecting code added frame/packet identification number adder 202 adds an error detecting code and a frame/packet identification number for the reception apparatus to detect a transmission error and a packet loss of encoded packet data that are output from first transmission frame/packet selector 201.

As shown in FIG. 2, second moving picture code converter/transmitter 220 has decoder 203, interframe predictor 204, predicted residual calculator 205, second prediction error compression encoder 206, second encoded packet generator 207, second error detecting code added frame/packet identification number adder 208, predicted residual decoder 209, reference frame storage memory 211, and decoded image calculator 210. Second moving picture code converter/transmitter 220 corresponds to second moving picture code converter/transmitter 104 shown in FIG. 1, and decoder 203 corresponds to moving picture data decoder 103 shown in FIG. 1.

In FIG. 2, decoder 203 decodes at least a portion of encoded moving picture data that are input thereto.

Interframe predictor 204 performs an interframe prediction on an input image from at least one decoded image that is stored in reference frame storage memory 211.

Predicted residual calculator 205 calculates a predicted residual by subtracting a predicted image produced by interframe predictor 204 from an input frame image.

Second predicted residual compression encoder 206 performs compression encoding of a predicted residual image obtained by predicted residual calculator 205 according to a predetermined process.

Second encoded packet generator 207 converts an interframe predictive parameter obtained by interframe predictor 204 and compressed data of a predicted residual image obtained by second predicted residual compression encoder 206 into a bit stream according to variable length coding, and outputs the bit stream in unit of predetermined packet.

Second error detecting code added frame/packet identification number adder 208 adds an error detecting code and a frame/packet identification number for the reception apparatus to detect a transmission error and a packet loss of encoded packet data that are output from second encoded packet generator 207.

Predicted residual decoder 209 determines decoded data of a predicted residual encoded by second error detecting code added frame/packet identification number adder 208.

Decoded image calculator 210 determines a decoded image by adding a predicted image generated by interframe predictor 204 and a predicted residual decoded by predicted residual decoder 209.

Reference frame storage memory 211 stores a decoded image in preparation for encoding a next frame.

In FIG. 2, third moving picture code converter/transmitter 230 has third predicted residual compression encoder 212, third encoded packet generator 213, and third error detecting code added frame/packet identification number adder 214. Third moving picture code converter/transmitter 230 corresponds to third moving picture code converter/transmitter 105 shown in FIG. 1.

Third predicted residual compression encoder 212 encodes a predicted residual image obtained by predicted residual calculator 205 at a compression ratio equal to or higher than first (second) predicted residual compression encoder 206.

Third encoded packet generator 213 converts an interframe predictive parameter obtained by interframe predictor 204 and compressed data of a predicted residual image obtained by third predicted residual compression encoder 212 into a bit stream according to variable length coding, and outputs the bit stream in unit of predetermined packet.

Third error detecting code added frame/packet identification number adder 214 adds an error detecting code and a frame/packet identification number for the reception apparatus to detect a transmission error and a packet loss of compressed packet data that are output from third encoded packet generator 213.

When the above processors operate, third encoded moving picture data are produced and transmitted as packets by a predetermined transmitting means.

In the present embodiment, since M is 2 and N is 3, encoded moving picture data selected depending on the bands that can be used by transmission paths from the above first to third encoded moving picture data are transmitted to each of the two transmission paths. In FIG. 1, two code conversion/transmission processors 1, 2 are provided, and code conversion/transmission processors 1, 2 transmit data to each of the three transmission paths.

In the present embodiment, first error detecting code added frame/packet identification number adder 202 is provided, and an error detecting code and a frame/packet identification number are added to first encoded data that are output from first transmission frame/packet selector 201. If such information has already been added to moving picture packet data that have been input, then first error detecting code added frame/packet identification number adder 202 may be dispensed with. Alternatively, any other processes may be employed insofar as they enable the code conversion/reception apparatus to detect a transmission error and a packet loss of encoded packet data that are transmitted. For example, if a first encoded packet transmission path has a mechanism for detecting a transmission error, then first error detecting code added frame/packet identification number adder 202 does not need to add an error correcting code. According to another example, if encoded data output from first transmission frame/packet selector 201 include information capable of identifying frames and packets, then first error detecting code added frame/packet identification number adder 202 does not need to add a frame/packet identification number.

Similarly, although second error detecting code added frame/packet identification number adder 208 is provided to add an error detecting code and a frame/packet identification number to second encoded data, any other processes may be employed insofar as they enable the code conversion/reception apparatus to detect a transmission error and a packet loss of encoded packet data that are transmitted.

Likewise, although third error detecting code added frame/packet identification number adder 214 is provided to add an error detecting code and a frame/packet identification number to third encoded data, any other processes may be employed insofar as they enable the code conversion/reception apparatus to detect a transmission error and a packet loss of encoded packet data that are transmitted.

According to a further specific example of the present embodiment described above, the moving picture code conversion/transmission apparatus is connected to an Internet communication network, compresses a moving picture captured and input through a CCD (charge coupled device) camera, for example, into encoded data according to an MPEG-4 visual scheme, and input the data to be transmitted by the UDP (User Datagram Protocol)/IP (Internet Protocol).

In FIG. 2, interframe predictor 204 performs an interframe prediction based on motion compensation. First predicted residual compression encoder 206 and third predicted residual compression encoder 212 perform a compression process according to two-dimensional discrete cosine transform (2D-DCT) and quantization. Second predicted residual compression encoder 212 compresses third encoded data at a compression ratio equal to or higher than the first encoded data, according to a process which quantizes 2D-DCT coefficients using a quantizing parameter that is greater than first predicted residual compression encoder 206 or a process which adaptively removes higher-order 2D-DCT coefficients. Predicted residual decoder 209 performs inverse quantization and two-dimensional inverse discrete cosine transform (2D-IDCT).

Second encoded packet generator 207 encodes quantized DCT coefficients output from second predicted residual compression encoder 206, a motion vector output from interframe predictor 204 and the like, according to a syntax prescribed by the MPEG-4 Visual scheme. Similarly, third encoded packet generator 213 encodes quantized DCT coefficients output from third predicted residual compression encoder 212, a motion vector output from interframe predictor 204 and the like, according to a syntax prescribed by the MPEG-4 Visual scheme. First error detecting code added frame/packet identification number adder 202, second error detecting code added frame/packet identification number adder 208, and third error detecting code added frame/packet identification number adder 214 generate a UDP datagram including a check sum for error detection to send it to the code conversion/reception apparatus that is connected to the Internet.

Figure 3:
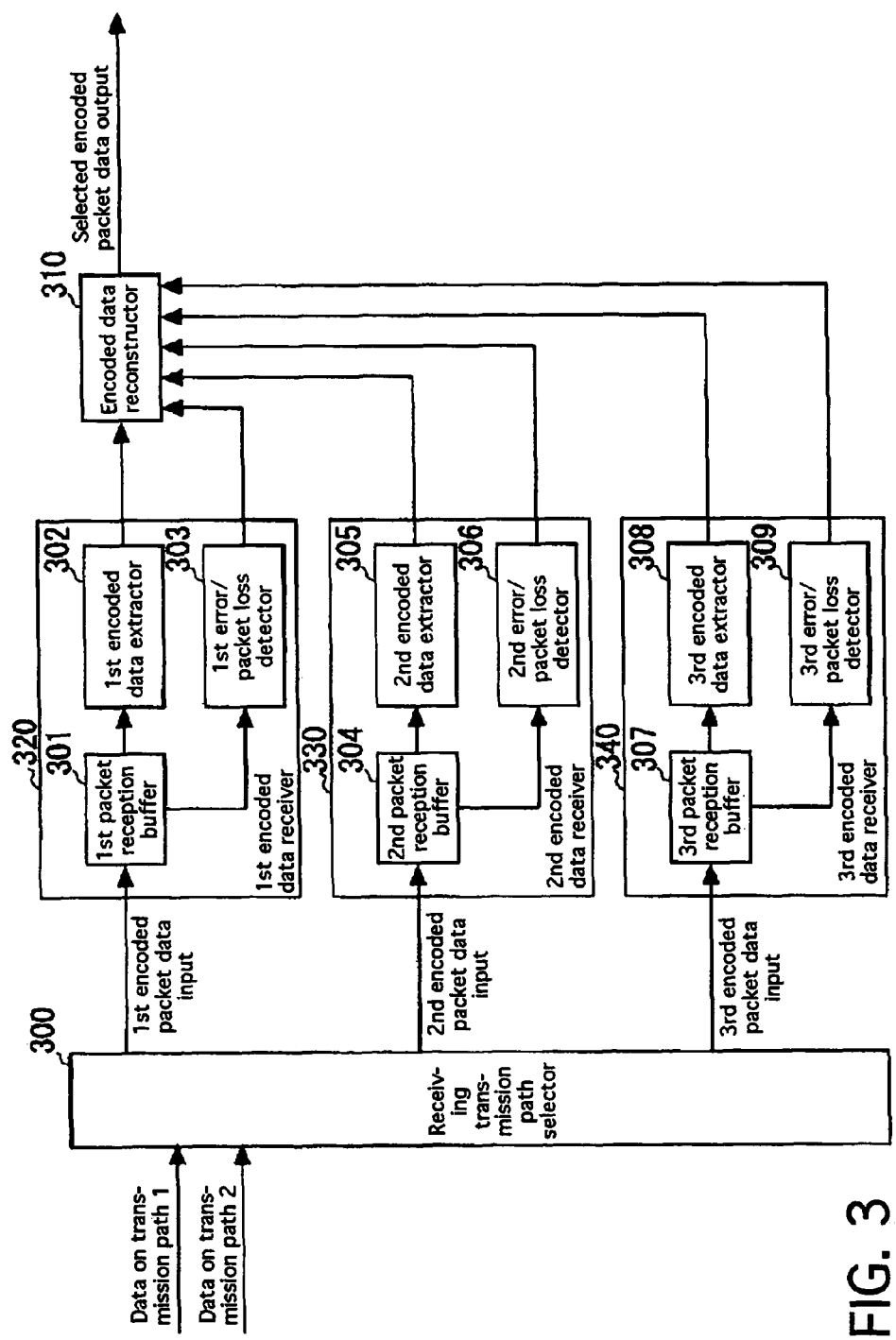
FIG. 3 is a block diagram illustrating an example of an arrangement of a moving picture code conversion/reception apparatus according to the present invention.

(1. C) Code Conversion/Reception Apparatus:

FIG. 3 shows a detailed arrangement of moving picture code conversion/reception apparatus 120 (see FIG. 1) according to the first embodiment of the present invention. In FIG. 3, the moving picture code conversion/reception apparatus comprises transmission path selector 300, first to third encoded data receivers 320, 330, 340 and encoded data reconstructor 310.

First encoded data receiver 320 comprises first packet reception buffer 301, first encoded data extractor 302, and first error/packet loss detector 303. The second and third encoded data receivers are of the same arrangement as the first encoded data receiver.

Receiving transmission path selector 300, which is shown as receiving transmission path selector 107 in FIG. 1, selects transmission path 130 (see FIG. 1) for encoding conversion/reception apparatus 120 (see FIG. 1) to receive moving picture data therethrough. First packet reception buffer 301 receives first encoded packet data transmitted from code conversion/transmission apparatus 100 (see FIG. 1). First encoded data extractor 302 extracts encoded moving picture data from packet data that are received by first packet reception buffer 301. First error/packet loss detector 303 detects a bit error and/or a packet loss that is generated upon the transmission of the first encoded packet data.

In second encoded data receiver 330, second packet reception buffer 304 receives second encoded packet data transmitted from code conversion/transmission apparatus 100 (see FIG. 1). Second encoded data extractor 305 extracts encoded moving picture data from packet data that are received by second packet reception buffer 304. Second error/packet loss detector 306 detects a bit error and/or a packet loss that is generated upon the transmission of the second encoded packet data.

In third encoded data receiver 340, third packet reception buffer 307 receives third encoded packet data transmitted from code conversion/transmission apparatus 100 (see FIG. 1). Third encoded data extractor 308 extracts encoded moving picture data from packet data that are received by third packet reception buffer 307. Third error/packet loss detector 309 detects a bit error and/or a packet loss that is generated upon the transmission of the third encoded packet data.

Encoded data reconstructor 310 reconstructs two encoded data transmitted from the code conversion/transmission apparatus into one encoded data according to detected results of bit errors and/or packet losses from first to third error/packet loss detectors 303, 306, 309.

Figure 4:
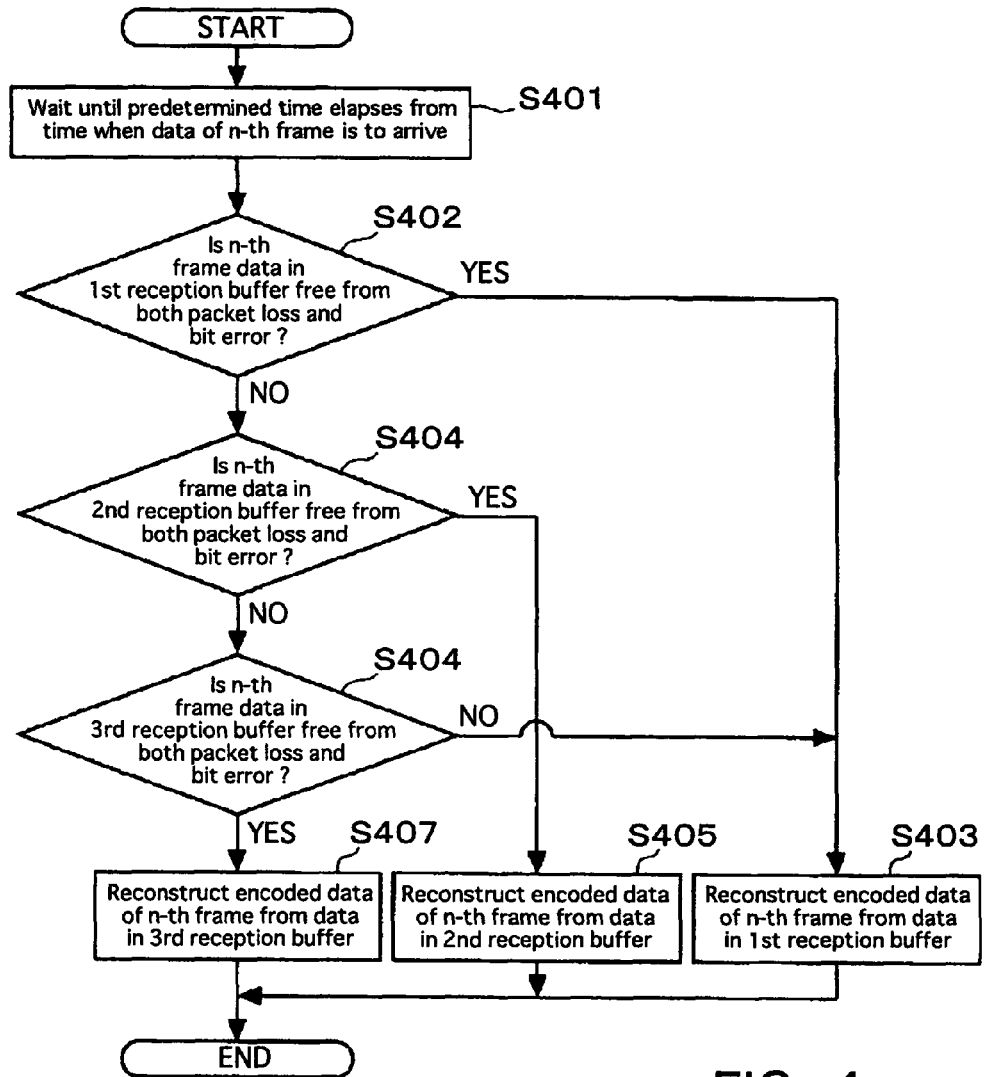
FIG. 4 is a flowchart illustrating an encoded data reconstructing sequence performed by a moving picture code conversion/reception apparatus according to the first embodiment.

An encoded data reconstructing procedure provided by encoded data reconstructor 310 in the present embodiment will be described below with reference to a flowchart shown in FIG. 4. The sequence of procedure shown in FIG. 4 represents a sequence for reconstructing the encoded data of an $n^{th}$ frame where n represents an integer.

In step S401, control waits until a time which is the sum of a time when all encoded data of the $n^{th}$ frame are to arrive at first packet reception buffer 301 and second packet reception buffer 304 and a predetermined allowable maximum delay time. Then, control goes to step S402.

In step S402, it is determined whether the $n^{th}$ frame data stored in first packet reception buffer 301 contain a packet loss and/or a bit error or not based on the detection result of bit errors and/or packet losses from first error/packet loss detector 303.

If all the encoded data of the $n^{th}$ packet are received in first packet reception buffer 301 and no error is detected in the data, then control branches to step S403. Otherwise, control goes to step S404.

If control branches to step S403, then the encoded data of the $n^{th}$ frame from first encoded data extractor 302 is output, and the encoded data reconstructing sequence is ended.

If control goes to step S404 from the decision in step S402, then it is determined whether the $n^{th}$ frame data stored in second packet reception buffer 304 contain a packet loss and/or a bit error or not based on the detection result of bit errors and/or packet losses from second error/packet loss detector 306. If all the encoded data of the $n^{th}$ packet are received in second packet reception buffer 304 and no error is detected in the data, then control branches to step S405. Otherwise, control goes to step S406.

If control goes to step S406, then it is determined whether the $n^{th}$ frame data stored in third packet reception buffer 307 contain a packet loss and/or a bit error or not based on the detection result of bit errors and/or packet losses from third error/packet loss detector 307. If all the encoded data of the $n^{th}$ packet are received in third packet reception buffer 307 and no error is detected in the data, then control branches to step S407. Otherwise, control goes to step S403.

In step S407, the encoded data of the $n^{th}$ frame from third encoded data extractor 308 is output as encoded data to be decoded, and the encoded data reconstructing sequence is ended.

In the present embodiment, the process of detecting a transmission error and/or an error packet loss of the first encoded data in first error/packet loss detector 303 may be any process. For example, the process may detect a transmission error and/or an error packet loss based on an error detecting code and a frame/packet number that are added by the code conversion/transmission apparatus according to the present embodiment. Alternatively, if the transmission paths for encoded data have an error detecting function, then the process may utilize the detection results. If information for specifying encoded frames is contained in encoded data, then the process may utilize the information included in the encoded frames.

Similarly, the process of detecting a transmission error and/or an error packet loss of the second encoded data in second error/packet loss detector 306 may be any process. The process of detecting a transmission error and/or an error packet loss of the third encoded data in third error/packet loss detector 309 may also be any process.

The process of waiting for the $n^{th}$ frame encoded data reception in step S401 in the encoded data reconstructing sequence performed by encoded data reconstructor 310 may be any process insofar as it is able to detect a packet loss while holding a packet transmission delay within a predetermined range.

If a transmission error or a packet loss is detected in the encoded data received by the third reception buffer in step S406 of the encoded data reconstructing sequence performed by encoded data reconstructor 310, i.e., if a transmission error or a packet loss occurs in all the first to third encoded data, then encoded data reconstructor 310 may perform any other processes.

In the present embodiment, control goes to step S403 in which the first encoded data is output as encoded data to be decoded. However, any other processes, such as, for example, a process of stopping outputting the $n^{th}$ frame and using the image data of a previously output $(n-1)^{th}$ frame as the output of the $n^{th}$ frame, may be performed.

In the specific example of the present embodiment, the code conversion/reception apparatus is connected to an Internet communication network, receives packet data transmitted according to the UDP/IP protocol from a code conversion/transmission apparatus that is connected to the Internet communication network at another site, converts encoded moving picture data included in the received UDP datagram, and outputs the converted data to the decoding apparatus. The encoded moving picture data are in accordance with the MPEG-4 Visual scheme. First error/packet loss detector 303, second error/packet loss detector 306, and third error/packet loss detector 309 detect a transmission error by calculating a check sum included in the UDP datagram.

(1. D) Transmission Mode of Encoded Packet Data:

According to the present invention, the first or second encoded packet data may be transmitted from code conversion/transmission apparatus 100 (see FIG. 1) to code conversion/reception apparatus 120 (see FIG. 1) according to any processes. However, in order to enhance the advantages of the present invention, it is preferable to employ processes which reduce the correlation between bit errors and packet losses that occur in the first encoded packet data and bit errors and packet losses that occur in the second encoded packet data that are produced by encoding the same frame image.

Figure 5:
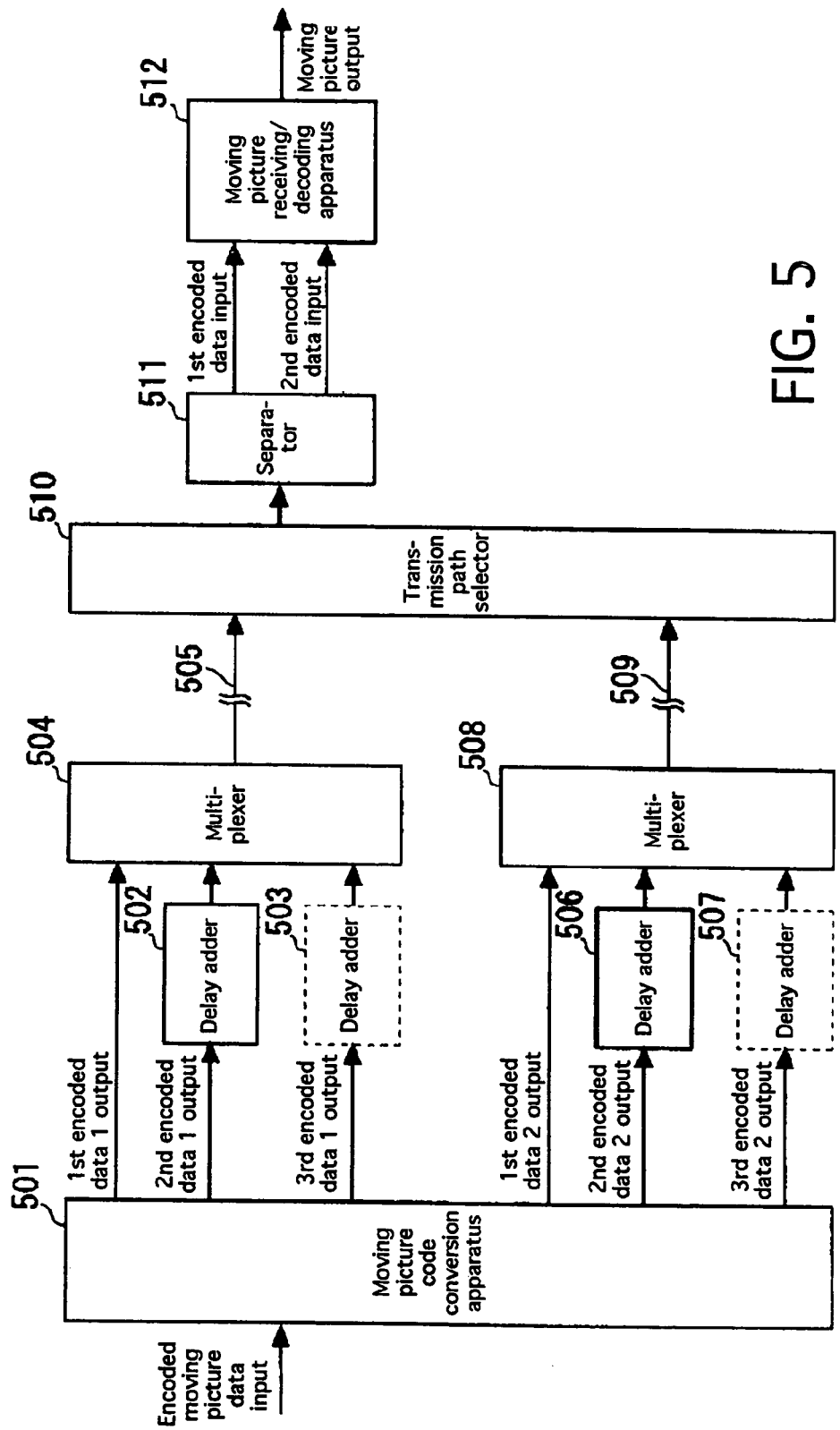
FIG. 5 is a block diagram illustrating an example of an arrangement of an encoded moving picture data packet transmission system according to the present invention.

FIG. 5 shows an example of such a preferred process of transmitting encoded packet data. In FIG. 5, code conversion/transmission apparatus 501 is the code conversion/transmission apparatus described with reference to FIG. 2. Delay adders 502 and 503 add a constant or adaptively changing delay time to the second and third encoded packet data output from code conversion/transmission apparatus 501, and output the resultant data.

Multiplexer 504 multiplexes the first encoded data output from code conversion/transmission apparatus 501 that is shown as code conversion/transmission apparatus 100 in FIG. 1, the second encoded data output from delay adder 502, and the third encoded data output from delay adder 503, and sends the multiplexed data to transmission path 505.

Transmission path 505 transmits the data multiplexed by multiplexer 504 from a transmission apparatus to a reception apparatus. Delay adders 506, 507 and multiplexer 508 perform the process for sending similar data to second transmission path 509.

Transmission path selector 510 selects at least one of transmission path 505 and transmission path 509. Separator 511 receives data from transmission path selector 510, and separates the data into the first encoded data and the second encoded data. Moving picture receiving/decoding apparatus 512 comprises the moving picture code conversion/reception apparatus described with reference to FIG. 3.

Delays added to the second and third encoded data by delay adders 502, 503 are determined by a maximum burst time of bit errors and packet losses that occur in transmission path 505. Even if a burst error occurs in transmission path 505, the probability that any of the first to third encoded data produced by encoding the same frame is affected by the error is small, making it possible to reduce the occurrence of significant image quality deteriorations due to a loss of encoded frame data. The delays are set in the delay adders based on the buffer size in the reception apparatus and the transfer rate (bit rate) of the transmission path.

Similarly, delays added to the second and third encoded data by delay adders 506, 507 are determined by a maximum burst time of bit errors and packet losses that occur in transmission path 509. Even if a burst error occurs in transmission path 509, the probability that any of the first to third encoded data produced by encoding the same frame is affected by the error is small, making it possible to reduce the occurrence of significant image quality deteriorations due to a loss of encoded frame data. The delay adders, or the delay adders and the multiplexers may be provided within code conversion/transmission apparatus 501.

(1. E) Advantages:

According to the first embodiment, moving picture code conversion/transmission apparatus 100 converts the same moving picture data into three encoded data and sends the encoded data with time differences that are constant or adaptively changed to transmission paths 130.

First code converter/transmitter 102 adaptively selects and outputs frames of input moving picture data according to the nature of the moving picture or predetermined rules. Second code converter/transmitter 104 decodes at least a portion of the input moving picture data, encodes the data at a compression ratio equal to or higher than the input data, and transmits the encoded data. Third code converter/transmitter 105 encodes the frame encoded by second code converter/transmitter 104, using at least one of interframe predictive parameters and predicted residual image data that are obtained by the encoding of that frame with second code converter/transmitter 104.

Code conversion/reception apparatus 120 side receives data from at least one transmission path among the M transmission paths, and selects and outputs, in terms of frames, encoded data of good image quality, which has the lowest compression ratio, from the encoded data that have been received normally.

As a result, even if transmission paths having low reliability which tend to suffer frequent transmission errors and packet losses of highly burst nature are employed, the probability that all of the three encoded data are transmitted in error is reduced, preventing a decoded image produced after the data transmission from being significantly corrupted.

By increasing the compression ratio of the second and third encoded data, it is possible to reduce an increase in the transmission band owing to the transmission of these encoded data. In addition, the first to third encoded data can be transmitted to a plurality of transmission paths having different bands, depending on the bands that can be used, and the influence errors in the transmission paths can be reduced. Furthermore, since at least one of the received three encoded data is selected by the moving picture code conversion/reception apparatus and output to the moving picture decoding apparatus, the amount of calculations required by the moving picture decoding apparatus is not greatly increased compared with ordinary moving picture decoding apparatus.

In the present embodiment, the code conversion/transmission apparatus and the code conversion/reception apparatus are used in combination with each other. However, no problem will arise if they are used independently of each other. The first to $N^{th}$ code conversion data may have their packets shuffled and multiplexed in their sequence according to an interleave process or the like. The interleave process can average the chronologically changing effect that transmission paths such as circuits or the like have.

(2) Second Embodiment

According to a second embodiment of the present invention, a code conversion/transmission apparatus, where N represents an integer of 2 or more and M represents an integer of 1 or more, has:

(a) first moving picture code converter/transmitter for being supplied with compressed encoded packet data and controlling transmission, with a predetermining transmitting means, of all the packets or packets which have adaptively been selected according to the nature of the input moving picture or predetermined rules;

(b) second to $N^{th}$ moving picture code converter/transmitters for decoding at least a portion of the input encoded packet data, performing compression encoding of the data into packet data at a compression ratio equal to or higher than the first moving picture code converter/transmitter, and controlling transmission, with a predetermined transmitting means, of all the packet data that are obtained or packet data which have adaptively been selected according to the nature of the input moving picture or predetermined rules, with constant or adaptively changing transmission time differences; and (c) a mechanism for selecting compression ratios of first to $N^{th}$ moving picture code converter/transmitters and/or the number of encoded data to be transmitted depending on bands that can be used by first to $M^{th}$ transmission paths, and transmitting the encoded data to the first to $M^{th}$ transmission paths.

The code conversion/reception apparatus side comprises a receiving transmission path selector for selecting at least one transmission path from the M transmission paths, receiving N encoded data from the selected transmission path, and selecting and outputting packet data of good image quality, which has the lowest compression ratio, for example, from the packet data that are received free of transmission errors or losses, which have been produced by encoding an image in the same area of the same frame.

The components of the code conversion/transmission apparatus and the code conversion/reception apparatus have their processing and function realized by a program that is executable by a computer serving as the code conversion/transmission apparatus and the code conversion/reception apparatus.

The second embodiment will be described in greater detail below:

(2. A) General:

The arrangement and operation of the system according to the present embodiment are substantially the same as those of the first embodiment. As shown in FIG. 1, the arrangement comprises code conversion/transmission apparatus 100, code conversion/reception apparatus 120, and transmission paths 130 for transmitting encoded data. The integer N represents the number of encoded data transmitted by the code conversion/transmission apparatus, and is 2 or more. The integer M represents the number of transmission paths to which N encoded data are sent, and is 1 or more.

Moving picture code conversion/transmission apparatus 100 has an arrangement which is substantially the same as that of the first embodiment, but slightly differs therefrom as to operation of various components of the apparatus. Only the differences between operation of the present embodiment and operation of the first embodiment will be described below.

Encoded data of an input frame image that is encoded by first moving picture encoder/transmitter (first moving picture code converter/transmitter) 102 comprise at least one packet data, each packet data including encoded interframe predictive parameters and encoded compressed differential image data with respect to an image area included in the input frame image. First moving picture encoder/transmitter 102 sends at least a portion of packets of an input moving picture to a moving picture code conversion/reception apparatus.

Second moving picture converter/transmitter (second moving picture code converter/transmitter) 104 decodes at least a portion of input moving picture data, performs a predetermined compression encoding process of the obtained image at a compression ratio equal to or higher than the first encoded moving picture data, and sends at least a portion of the encoded data to the moving picture code conversion/reception apparatus.

Third to $N^{th}$ moving picture encoder/transmitters (third to $N^{th}$ moving picture code converter/transmitters) 105 encode, all the packets encoded by the second moving picture code converter/transmitter or an image area included in the packet, at a compression ratio equal to or higher than the second moving picture encoder/transmitter, using the data of at least one of interframe predictive parameters and a predicted differential image data that are obtained by an interframe prediction performed on that image area by second moving picture encoder/transmitter, and sends at least a portion of the encoded data that are obtained to the moving picture code conversion/reception apparatus. Other operational details are essentially the same as those of the first embodiment.

The moving picture code conversion/reception apparatus has an arrangement which is substantially the same as that of the first embodiment, but slightly differs therefrom as to operation of various components of the apparatus. Only the differences between operation of the present embodiment and operation of the first embodiment will be described below.

As with the first embodiment, encoded data reconstructor 112 selects packets of good image quality, which has the lowest compression ratio, for example, as encoded data to be decoded from a maximum of N encoded packet data that are received free of transmission errors or losses by the first to $N^{th}$ encoded data receivers and include compressed data in the same area of the same frame. Encoded data reconstructor 112 performs the selection on each packet data transmitted by the code conversion/transmission apparatus. Other operational details are essentially the same as those of the first embodiment.

(2. B) Code Conversion/transmission Apparatus:

An arrangement and operation of the moving picture code conversion/transmission apparatus according to the present embodiment are substantially the same as those of the moving picture code conversion/transmission apparatus according to the first embodiment shown in FIG. 2. However, first encoded packet selector 201, second encoded packet generator 207, third encoded packet generator 213, first error detecting code added frame/packet number adder 202, second error detecting code added frame/packet number adder 208, and third error detecting code added frame/packet number adder 214 shown in FIG. 2 operate differently from those of the first embodiment. The differences will be described below, with the description of identical portions being omitted.

In the moving picture code conversion/transmission apparatus according to the present embodiment, first encoded packet selector 201, second encoded packet generator 207, and third encoded packet generator 213 generate encoded packet data such that an image area included in encoded packet data selected by first encoded packet selector 201, an image area included in encoded packet data generated by second encoded packet generator 207, and an image area included in encoded packet data generated by third encoded packet generator 213 coincide with each other.

First error detecting code added frame/packet number adder 202, second error detecting code added frame/packet number adder 207, and third error detecting code added frame/packet number adder 213 operate to add the same packet identification number to encoded packet data corresponding to the same image area in the same frame. If packet data generated by the first to third encoded packet generators include information for specifying the position of an image area included in the packet data, then no frame/packet number may be added.

A specific example of the present embodiment employs the MPEG-4 Visual scheme for compressing moving pictures. According to this scheme, an input image frame is divided into rectangular areas of a constant size, called "macroblocks", and compressed, and the image information compressed in terms of macroblocks is encoded into a bit stream for each packet referred to as a video packet. The video packet includes compressed data of a desired number of macroblocks in the same frame, and the bit stream data encoded by the present process can be decoded for each video packet. First encoded packet selector 201, second encoded packet generator 207, and third encoded packet generator 213 output encoded data for each video packet. The video packet encoded by second encoded packet generator 207 and the video packet encoded by third encoded packet generator 213 are generated so as to include macroblocks in the same area as the video packet selected by first encoded packet selector 201.

(2. C) Code Conversion/reception Apparatus:

An arrangement and operation of the moving picture code conversion/reception apparatus according to the present embodiment are substantially the same as those of the moving picture code conversion/reception apparatus according to the first embodiment shown in FIG. 3, and differs therefrom only as to operation of encoded data reconstructor 310 shown in FIG. 3. The differences will be described below, with the description of identical portions being omitted.

Figure 6:
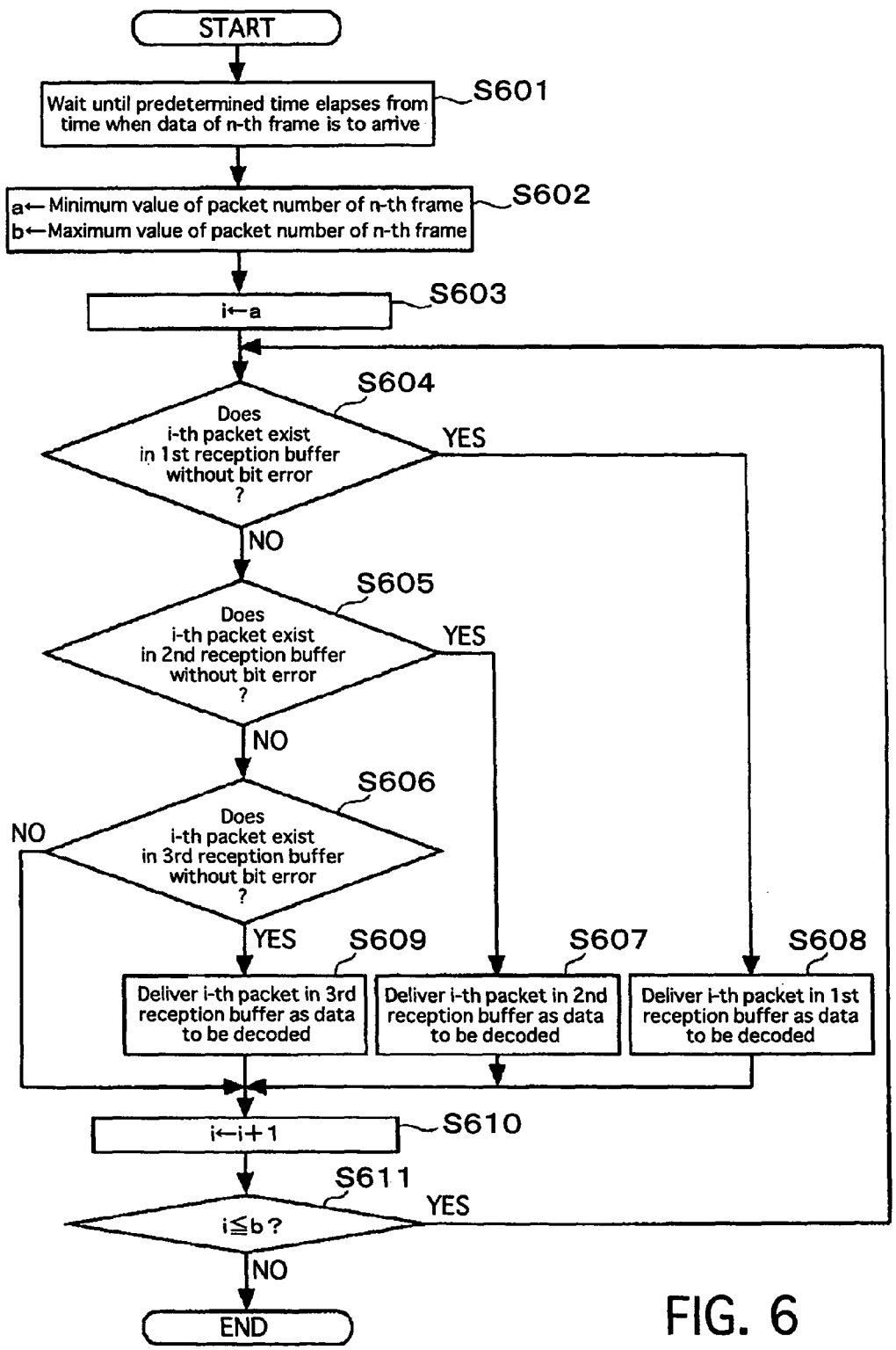
FIG. 6 is a flowchart illustrating an encoded data reconstructing sequence performed by a moving picture code conversion/reception apparatus according to the second embodiment.

An encoded data reconstructing sequence performed by encoded data reconstructor 310 according to the present embodiment will be described below with reference to a flowchart illustrated in FIG. 6. The sequence of procedure shown in FIG. 6 represents a sequence for reconstructing the encoded data of an $n^{th}$ frame where n represents an integer.

In step S601, control waits until a time which is the sum of a time when all encoded data of the $n^{th}$ frame are to arrive at first packet reception buffer 301, second packet reception buffer 304, and third packet reception buffer 307 and a predetermined allowable maximum delay time. Then, control goes to step S602.

In step S602, the minimum value of packet numbers of the $n^{th}$ frame is stored as a variable a for storing a packet number, and the maximum value of packet numbers of the $n^{th}$ frame is stored as a variable b.

In step S603, the value of the variable a is put into a variable i for storing a packet number. Then, a repetitive sequence from step S604 is started.

In step S604, it is determined whether an $i^{th}$ packet of the $n^{th}$ frame exists in first packet reception buffer 301 or not and there is a bit error or not based on the detected result of errors and/or packet losses from first error/packet loss detector 303. If an $i^{th}$ packet of the $n^{th}$ frame is received in first packet reception buffer 301 and no error is detected in the data, then control goes to step S608. Otherwise, control goes to step S605.

If control goes to step S608, the encoded data of the $n^{th}$ frame output from first encoded data extractor 302 is output as encoded data to be decoded, and control goes to step S610.

If control goes to step S605, then it is determined whether an $i^{th}$ packet of the $n^{th}$ frame exists in second packet reception buffer 304 or not and there is a bit error or not based on the detected result of errors and/or packet losses from second error/packet loss detector 306. If an $i^{th}$ packet of the $n^{th}$ frame is received in second packet reception buffer 304 and no error is detected in the data, then control goes to step S607. Otherwise, control goes to step S606.

In step S607, the encoded data of the $n^{th}$ frame output from second encoded data extractor 305 is output as encoded data to be decoded, and control goes to step S610.

If control goes to step S606, then it is determined whether an $i^{th}$ packet of the $n^{th}$ frame exists in third packet reception buffer 307 or not and there is a bit error or not based on the detected result of errors and/or packet losses from third error/packet loss detector 309. If an $i^{th}$ packet of the $n^{th}$ frame is received in third packet reception buffer 307 and no error is detected in the data, then control goes to step S609. Otherwise, control goes to step S610.

In step S610, the variable i is incremented by 1. In step S611 following step S610, it is determined whether the variable i exceeds the value of the variable b or not. If the variable i does not exceed the value of the variable b, then the processing from step S604 is repeated. If the variable i exceeds the value of the variable b, then the repetitive sequence is finished, putting the sequence for reconstructing the $n^{th}$-frame encoded data to an end.

The process of waiting for the $n^{th}$-frame encoded data in step S601 in the encoded data reconstructing sequence performed by encoded data reconstructor 310 may be any process insofar as it is able to detect a packet loss while holding a packet transmission delay within a predetermined range.

(2. D) Advantages:

According to the second embodiment, the moving picture code conversion/transmission apparatus converts the same moving picture data into three encoded data and sends the encoded data with time differences that are constant or adaptively changed. The second and third moving picture code converter/transmitters encode an image area included in a packet that has been converted by the first moving picture code converter/transmitter. The third encoder/transmitter encodes an image area included in a packet that has been converted by the second encoder/transmitter, using at least one of interframe predictive parameters and predicted residual image data that are obtained by the encoding of the frame with the first moving picture code converter/transmitter.

The code conversion/reception apparatus side selects and decodes packets of encoded data of good image quality, which has the lowest compression ratio, from the encoded data that have been received normally.

As a result, even if transmission paths which tend to suffer frequent transmission errors and packet losses of highly burst nature and are low in reliability are employed, the probability that all of the three encoded data are transmitted in error is reduced, preventing a decoded image produced after the data transmission from being significantly corrupted.

By increasing the compression ratio of the second and third encoded data, it is possible to reduce an increase in the transmission band owing to the transmission of these encoded data.

In addition, the first to third encoded data can be transmitted to a plurality of transmission paths having different bands, depending on the bands that can be used, and the influence of errors in the transmission paths can be reduced.

Furthermore, since at least one of the received three encoded data is selected by the moving picture code conversion/reception apparatus and output to the moving picture decoding apparatus, the amount of calculations required by the moving picture decoding apparatus is not greatly increased compared with ordinary moving picture decoding apparatus.

In the present embodiment, the code conversion/transmission apparatus and the code conversion/reception apparatus are used in combination with each other. However, no problem will arise if they are used independently of each other.

(3) Third Embodiment

According to a third embodiment of the present invention, a code conversion/transmission apparatus, where N represents an integer of 2 or more and M represents an integer of 1 or more, has:

(a) a first moving picture code converter/transmitter for being supplied with compressed encoded data, performing compression encoding of all the frames of decoded moving picture data or frames which have adaptively been selected according to the nature of the input moving picture or predetermined rules at a compression ratio equal to or higher than the input encoded data, and controlling transmission, with a predetermining transmitting means, of at least a portion of the encoded data thus obtained;

(b) second to $N^{th}$ moving picture code converter/transmitters for encoding all the frames encoded by the first moving picture code converter/transmitter or frames which have adaptively been selected according to the nature of the input moving picture or predetermined rules at a compression ratio equal to or higher than the first moving picture code converter/transmitter, re-using at least one of interframe predictive parameters and predicted differential image data that are obtained by an interframe prediction performed on that frame by the first moving picture code converter/transmitter, and sending the obtained encoded data over the same transmission path as or a transmission path different from the transmission path used by the first moving picture code converter/transmitter, with constant or adaptively changing transmission time differences; and (c) a mechanism for selecting compression ratios of first to $N^{th}$ moving picture code converting/transmitting means and/or the number of encoded data to be transmitted depending on bands that can be used by first to $M^{th}$ transmission paths, and transmitting the encoded data to the first to $M^{th}$ transmission paths.

The code conversion/reception apparatus comprises a selector for selecting at least one transmission path from the M transmission paths, receiving N encoded data from the selected transmission path, extracting encoded data which have been received free of transmission errors or losses, and selecting and outputting encoded moving picture data of good image quality, which has the lowest compression ratio, for example, from the encoded data in the same frame.

The components of the code conversion/transmission apparatus and the code conversion/reception apparatus have their processing and function realized by a program that is executable by a computer serving as the code conversion/transmission apparatus and the code conversion/reception apparatus.

Figure 7:
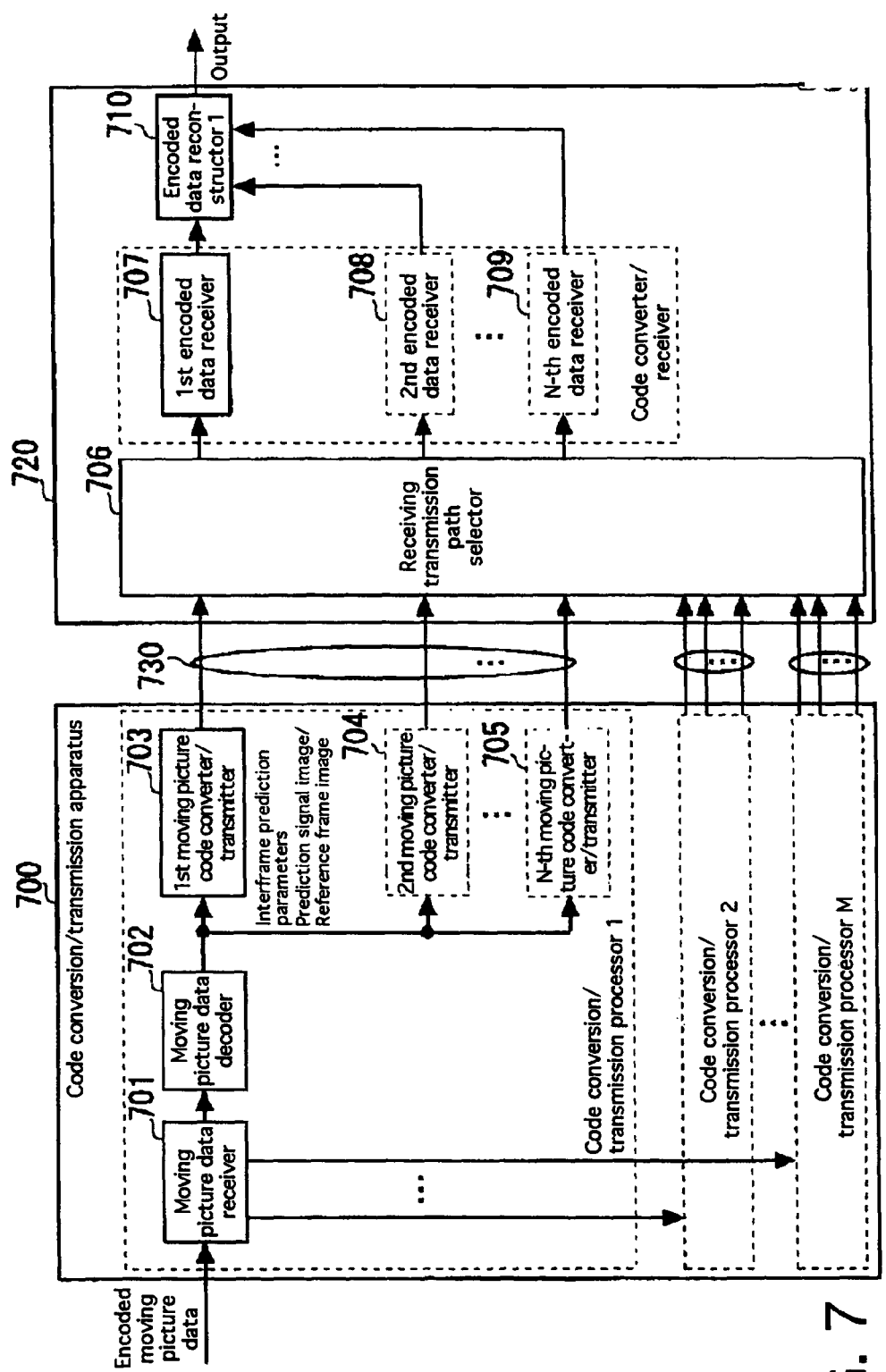
FIG. 7 is a block diagram illustrating an arrangement of a code conversion/transmission system according to third to sixth embodiments of the present invention.

The third embodiment will be described in greater detail below:

(3. A) General:

FIG. 7 is a diagram showing a system arrangement of the third embodiment of the present invention. As shown in FIG. 7, the third embodiment comprises code conversion/transmission apparatus 700 for moving picture data, code conversion/reception apparatus 720, and transmission paths 730 for transmitting encoded data. The integer N represents the number of encoded data transmitted by the code conversion/transmission apparatus, and is 2 or more. The integer M represents the number of transmission paths 730 to which N encoded data are sent, and is 1 or more.

Moving picture code conversion/transmission apparatus 700 decodes at least a portion of encoded moving picture data that are input thereto, performs a predetermined compression encoding process of the obtained image at a compression ratio equal to or higher than the input image, and transmits the code conversion data to moving picture code conversion/reception apparatus 720. Moving picture code conversion/transmission apparatus 700 encodes the input moving picture data into N encoded data, and transmits the encoded data as first to $N^{th}$ encoded moving picture data to first to $M^{th}$ transmission paths 730.

As shown in FIG. 7, the apparatus has first to $N^{th}$ moving picture encoder/transmitters (first to $N^{th}$ moving picture code converter/transmitters) 703 to 705.

Moving picture data receiver 701 receives moving picture data. Moving picture decoder 702 decodes at least a portion of the encoded moving picture data that are input thereto.

First moving picture encoder/transmitter (first moving picture code converter/transmitter) 703 performs a predetermined compression encoding process of a frame input to the code conversion/transmission apparatus (code converter/transmitter), and controls transmission at least a portion of the obtained encoded data to the moving picture code conversion/reception apparatus. Second to $N^{th}$ moving picture encoder/transmitters (second to $N^{th}$ moving picture code converter/transmitters) 704, 705 encode at least one of the frames encoded by first moving picture encoder/transmitter 703, at a compression ratio equal to or higher than first moving picture encoder/transmitter 703, using at least one of interframe predictive parameters and predicted differential image data that are obtained by an interframe prediction performed on that frame by the first moving picture encoder/transmitter, and sends at least a portion of the encoded data that are obtained to moving picture code conversion/reception apparatus 720 via transmission paths 730. Of the first to $N^{th}$ encoded moving picture data, encoded moving picture data selected depending on bands that can be used by the transmission paths are transmitted to the first to $M^{th}$ transmission paths.

In moving picture code conversion/transmission apparatus 720, receiving transmission path selector 706 selects at least one transmission path from the M transmission paths to which the moving picture code conversion/transmission apparatus has sent encoded data. Moving picture code conversion/reception apparatus 720 receives N encoded data from the selected transmission path, and decodes the encoded data.

As shown in FIG. 7, moving picture code conversion/reception apparatus 720 comprises first to $N^{th}$ encoded data receivers 707 to 709 for receiving encoded data transmitted to transmission paths 730 by first to $N^{th}$ moving picture code converter/transmitters 703 to 705 of code conversion/transmission apparatus 700, and an encoded data reconstructor 710. Encoded data reconstructor 710 selects and outputs data of good image quality, which has the lowest compression ratio, for example, from a maximum of N encoded data that are received free of transmission errors or losses by encoded data receivers 707 to 709.

Figure 8:
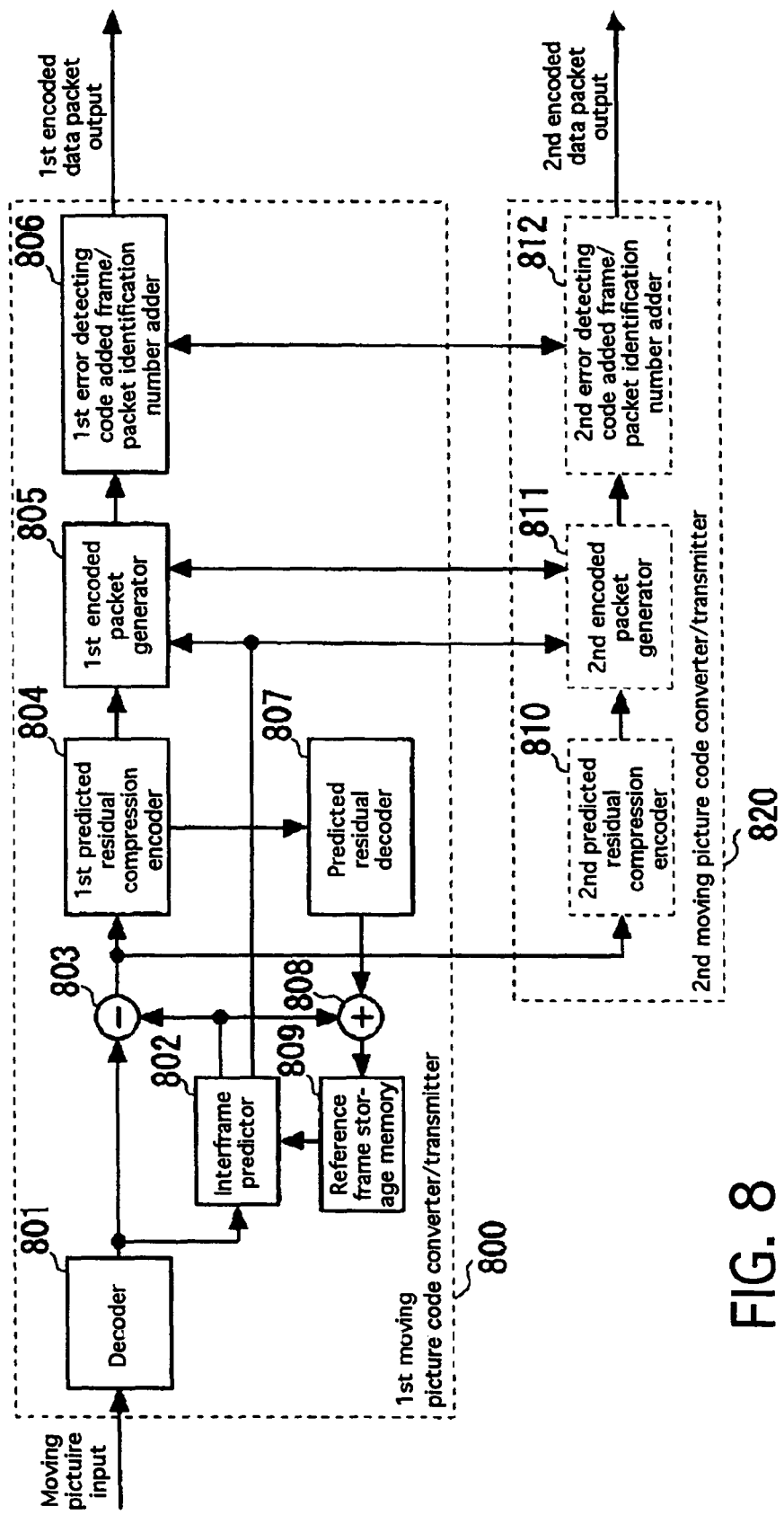
FIG. 8 is a block diagram illustrating an arrangement of a moving picture code conversion/transmission apparatus according to the third and fourth embodiments.

(3. B) Code Conversion/transmission Apparatus:

FIG. 8 shows a detailed arrangement of a moving picture code conversion/transmission apparatus according to the third embodiment. For the sake of brevity, it is assumed in FIG. 8 that the number N of encoded data output from this apparatus is 3 and the number M of transmission paths for transmitting encoded data is 2.

In FIG. 8, decoder 801 decodes at least a portion of encoded moving picture data that are input thereto. Interframe predictor 802 performs an interframe prediction on an image output from decoder 801 from at least one decoded image that is stored in reference frame storage memory 809. Predicted residual calculator 803 calculates a predicted residual by subtracting a predicted image produced by interframe predictor 802 from a frame image that is input thereto. First predicted residual compression encoder 804 performs compression encoding of the predicted residual image obtained by predicted residual calculator 803 according to a predetermined process. First encoded packet generator 805 converts an interframe predictive parameter obtained by interframe predictor 802 and compressed data of a predicted residual image obtained by first predicted residual compression encoder 804 into a bit stream according to variable length coding, and outputs the bit stream in terms of predetermined packets. First error detecting code added frame/packet identification number adder 806 adds an error detecting code and a frame/packet identification number for the reception apparatus to detect a transmission error and a packet loss of encoded packet data that are output from first encoded packet generator 805. Predicted residual decoder 807 determines decoded data of a predicted residual encoded by first error detecting code added frame/packet identification number adder 806. Decoded image calculator 808 determines a decoded image by a sum of a predicted image generated by interframe predictor 802 and a predicted residual decoded by predicted residual decoder 807. Reference frame storage memory 809 stores a decoded image in preparation for encoding a next frame.

In FIG. 8, second predicted residual compression encoder 810 encodes a predicted residual image obtained by predicted residual calculator 803 at a compression ratio equal to or higher than the first predicted residual compression encoder. Second encoded packet generator 811 converts an interframe predictive parameter obtained by interframe predictor 802 and compressed data of a predicted residual image obtained by second predicted residual compression encoder 810 into a bit stream according to variable length coding, and outputs the bit stream in terms of predetermined packets. Second error detecting code added frame/packet identification number adder 812 adds an error detecting code and a frame/packet identification number for the reception apparatus to detect a transmission error and a packet loss of compressed packet data that are output from second encoded packet generator 811. In this manner, second encoded moving picture data are produced and transmitted as packets by a predetermined transmitting mechanism.

In the present embodiment, since M is 2 and N is 2, encoded moving picture data selected depending on the bands that can be used by transmission paths from the above first and second encoded moving picture data are transmitted to each of the two transmission paths.

In the present embodiment, first error detecting code added frame/packet identification number adder 806 is provided, and first error detecting code added frame/packet identification number adder 806 adds an error detecting code and a frame/packet identification number to first encoded data that are output from first encoded packet generator 805. However, any other processes may be employed insofar as they enable the code conversion/reception apparatus to detect a transmission error and a packet loss of encoded packet data that are transmitted. For example, if a first encoded packet transmission path has a mechanism for detecting a transmission error, then first error detecting code added frame/packet identification number adder 806 does not need to add an error correcting code. According to another example, if encoded data output from first encoded packet generator 805 include information capable of identifying frames and packets, then first error detecting code added frame/packet identification number adder 806 does not need to add a frame/packet identification number.

Similarly, although second error detecting code added frame/packet identification number adder 812 is provided to add an error detecting code and a frame/packet identification number to second encoded data, any other processes may be employed insofar as they enable the code conversion/reception apparatus to detect a transmission error and a packet loss of encoded packet data that are transmitted.

A preferred specific example of the present embodiment described above is the same as that of the first embodiment described above.

(3. C) Code Conversion/reception Apparatus:

The moving picture code conversion/reception apparatus according to the third embodiment of the present invention is of an arrangement which is the same as that shown in FIG. 3. However, though the number M of transmission paths is 3 in FIG. 3, it is 2 in the present embodiment and hence no third encoder/receiver is present in the present embodiment. Since M is 2, encoded data reconstructor 310 has a different operation sequence.

Figure 9:
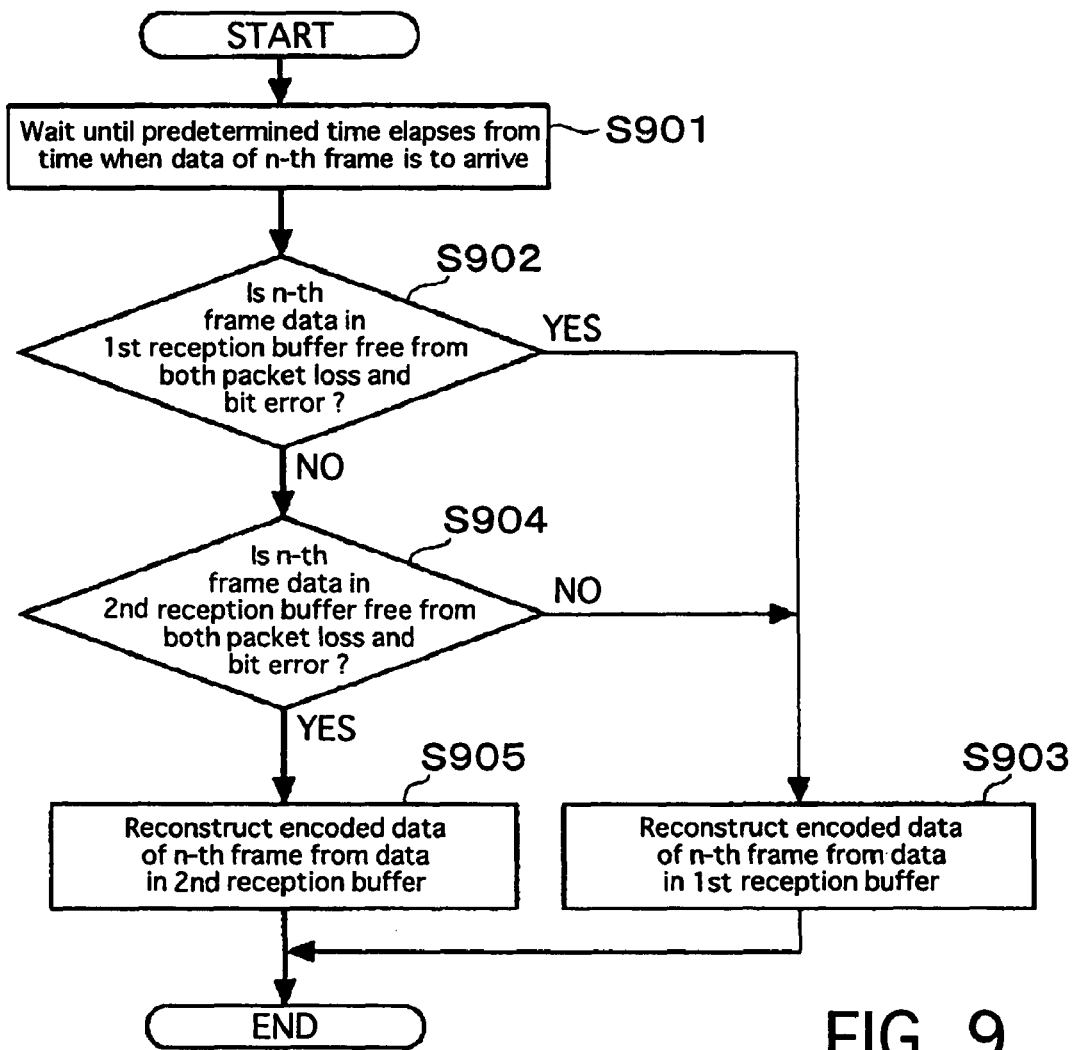
FIG. 9 is a flowchart illustrating an encoded data reconstructing sequence performed by a moving picture code conversion/reception apparatus according to the third, fifth, and eighth embodiments.

The operation sequence of encoded data reconstructor 310 according to the present embodiment will be described with reference to a flowchart shown in FIG. 9. The sequence of procedure shown in FIG. 9 represents a sequence for reconstructing the encoded data of an $n^{th}$ frame where n represents an integer.

In step S901, control waits until a time which is the sum of a time when all encoded data of the $n^{th}$ frame are to arrive at first packet reception buffer 301 and second packet reception buffer 304 and a predetermined allowable maximum delay time. Then, control goes to step S902.

In step S902, it is determined whether $n^{th}$ frame data are present in first packet reception buffer 301 or not and there is a bit error or not based on the detection result of bit errors and/or packet losses from first error/packet loss detector 303. If all the encoded data of the $n^{th}$ packet are received in first packet reception buffer 301 and no error is detected in the data, then control goes to step S903. Otherwise, control goes to step S904.

If control goes to step S903, then the encoded data of the $n^{th}$ frame supplied from first encoded data extractor 302 is transferred as encoded data to be decoded to a variable-length decoder (not shown, but included in a decoding apparatus shown in FIG. 16, for example), and the encoded data reconstructing sequence is ended.

If control goes to step S904, then it is determined whether $n^{th}$ frame data is present in second packet reception buffer 304 or not and there is a bit error or not based on the detection result of bit errors and/or packet losses from second error/packet loss detector 306. If all the encoded data of the $n^{th}$ packet are received in second packet reception buffer 304 and no error is detected in the data, then control goes to step S905. Otherwise, control goes to step S903.

In step S905, the encoded data of the $n^{th}$ frame from second encoded data extractor 305 is transferred as encoded data to be decoded to a variable-length decoder (not shown, but included in a decoding apparatus shown in FIG. 16, for example), and the encoded data reconstructing sequence is ended.

Operation and a preferred specific example of other portions of the present embodiment are the same as those of the first embodiment.

(3. D) Advantages:

According to the third embodiment, the moving picture code conversion/transmission apparatus decodes at least a portion of moving picture data input thereto, encodes the same moving picture data into two encoded data, and transmits the encoded data with time differences that are constant or adaptively changed. The second moving picture code converter/transmitter encodes a frame that has been encoded by the first moving picture code converter/transmitter, using at least one of interframe predictive parameters and predicted residual image data that are obtained by the encoding of the frame with the first moving picture code converter/transmitter.

The code conversion/reception apparatus side selects and outputs encoded data of good image quality, which has the lowest compression ratio, in terms of packets from the encoded data that have been received normally.

As a result, even if transmission paths which tend to suffer frequent transmission errors and packet losses of highly burst nature and are low in reliability are employed, the probability that both of the two encoded data are transmitted in error is reduced, preventing a decoded image produced after the data transmission from being significantly corrupted.

By increasing the compression ratio of the second encoded data, it is possible to reduce an increase in the transmission band owing to the transmission of the second encoded data.

In addition, the first and second encoded data can be transmitted to a plurality of transmission paths having different bands, depending on the situation of the transmission paths and the intention of the moving picture sender or the moving picture recipient, and the influence of errors in the transmission paths can be reduced.

Furthermore, since at least one of the received two encoded data is selected by the moving picture code conversion/reception apparatus and output to the moving picture decoding apparatus by the moving picture code conversion/reception apparatus, the amount of calculations required by the moving picture decoding apparatus is not greatly increased compared with ordinary moving picture decoding apparatus.

In the present embodiment, the code conversion/transmission apparatus and the code conversion/reception apparatus are used in combination with each other. However, no problem will arise if they are used independently of each other. The first to $N^{th}$ code conversion data may be transmitted in an interleaved fashion, rather than at spaced time intervals.

(4) Fourth Embodiment

According to a fourth embodiment of the present invention, a code conversion/transmission apparatus, where N represents an integer of 2 or more and M represents an integer of 1 or more, has:

(a) a first moving picture code converter/transmitter for decoding at least a portion of encoded packet data input thereto, performing compression encoding of the data at a compression ratio equal to or higher than the input moving picture data, and controlling transmission, with a predetermining transmitting means, of at least a portion of the encoded packet data thus obtained;

(b) second to $N^{th}$ moving picture code converter/transmitters for encoding an image area encoded by each packet data of all the packet data encoded by the first moving picture code converter/transmitter or packet data which have adaptively been selected according to the nature of the input moving picture or predetermined rules, into one packet data at a compression ratio equal to or higher than the first moving picture code converter/transmitter, reusing at least one of interframe predictive parameters and predicted differential image data that are obtained by an interframe prediction performed on that image area by the first moving picture code converter/transmitter, and controlling transmission of the obtained encoded packet data with constant or adaptively changing transmission time differences, with the same transmitting means as or a transmitting means different from the transmitting means used by the first moving picture code converter/transmitter; and (c) a means for selecting compression ratios of first to $N^{th}$ moving picture code converter/transmitters and/or the number of encoded data to be transmitted depending on bands that can be used by first to $M^{th}$ transmission paths, and transmitting the encoded data to the first to $M^{th}$ transmission paths.

The apparatus in the reception side comprises a selector for selecting at least one transmission path from the M transmission paths, receiving N encoded data from the selected transmission path, selecting and outputting encoded packet data of good image quality, which has the lowest compression ratio, for example, from the encoded packet data produced by encoding an image in the same area in the same frame.

The components of the code conversion/transmission apparatus and the code conversion/reception apparatus have their processing and function realized by a program that is executable by a computer serving as the code conversion/transmission apparatus and the code conversion/reception apparatus.

The fourth embodiment will be described in greater detail below:

(4. A) General:

An arrangement and operation of the present embodiment are substantially the same as those of the third embodiment. As shown in FIG. 7, the present embodiment comprises a code conversion/transmission apparatus, a code conversion/reception apparatus, and transmission paths for transmitting encoded data. The integer N represents the number of encoded data transmitted by the code conversion/transmission apparatus, and is 2 or more. The integer M represents the number of transmission paths to which N encoded data are sent, and is 1 or more.

The code conversion/transmission apparatus has an arrangement which is substantially the same as that of the third embodiment, but slightly differs therefrom as to operation of various components of the apparatus. Only the differences will be described below, with the description of identical portions being omitted.

A moving picture code conversion/transmission processor decodes at least a portion of encoded moving picture data input thereto, performs a predetermined compression encoding process of the obtained image at a compression ratio equal to or higher than the input moving picture data, and transmits the encoded data to the moving picture code conversion/reception apparatus. Encoded data of an input frame image that is encoded by the moving picture code conversion/transmission processor comprises at least one packet data, each packet data including encoded interframe predictive parameters and encoded compressed differential image data with respect to an image area included in the input frame image. The second to $N^{th}$ moving picture encoder/transmitters encode an image area included in at least one of packets encoded by the first moving picture encoder/transmitter, at a compression ratio equal to or higher than the first moving picture encoder/transmitter, using at least one of interframe predictive parameters and predicted differential image data that are obtained by an interframe prediction performed on that image area by the first moving picture encoder/transmitter, and transmit the obtained encoded packet data to the moving picture code conversion/reception apparatus. Other operational details are basically the same as those of the third embodiment.

The moving picture code conversion/reception apparatus has an arrangement which is substantially the same as that of the third embodiment, but slightly differs therefrom as to operation of various components of the apparatus. Only the differences will be described below, with the description of identical portions being omitted.

According to the present embodiment, as shown in FIG. 7, as with the third embodiment, encoded data reconstructor 710 selects at least one packet of good image quality, which has the lowest compression ratio, for example, as encoded data to be decoded, from a maximum of N encoded packet data that are received free of transmission errors or losses by the first to $N^{th}$ encoded data receivers. Encoded data reconstructor 710 performs the selection in terms of packet data transmitted by the code conversion/transmission apparatus. Other operational details are basically the same as those of the third embodiment.

(4. B) Code Conversion/transmission Apparatus:

An arrangement and operation of the moving picture code conversion/transmission apparatus according to the present embodiment are substantially the same as those of the moving picture code conversion/transmission apparatus according to the third embodiment shown in FIG. 8. However, first encoded packet generator 805, second encoded packet generator 811, first error detecting code added frame/packet number adder 806, and second error detecting code added frame/packet number adder 812, operate differently from those of the third embodiment.

In the moving picture data code conversion/transmission apparatus according to the present embodiment, first encoded packet generator 805 and second encoded packet generator 811 generate encoded packet data such that an image area included in encoded packet data generated by first encoded packet generator 805 and an image area included in encoded packet data generated by second encoded packet generator 811 coincide with each other.

First error detecting code added frame/packet number adder 806 and second error detecting code added frame/packet number adder 812 operate to add the same packet identification number to encoded packet data corresponding to the same image area in the same frame. If packet data generated by the first and second encoded packet generators include frame numbers and information for specifying the position of an image area included in the packet data, then no frame/packet identification number may be added.

Operation of the other processors than described above is the same as with the third embodiment. A preferred specific example of the present embodiment described above is the same as that of the second embodiment described above.

(4. C) Code Conversion/reception Apparatus:

An arrangement and operation of the moving picture code conversion/reception apparatus according to the present embodiment are substantially the same as those of the moving picture code conversion/reception apparatus according to the second embodiment shown in FIG. 3. However, though the number M of transmission paths is 3 in FIG. 3, it is 2 in the present embodiment and hence no third encoder/receiver is present in the present embodiment. Since M is 2, encoded data reconstructor 310 has a different operation sequence.

Figure 10:
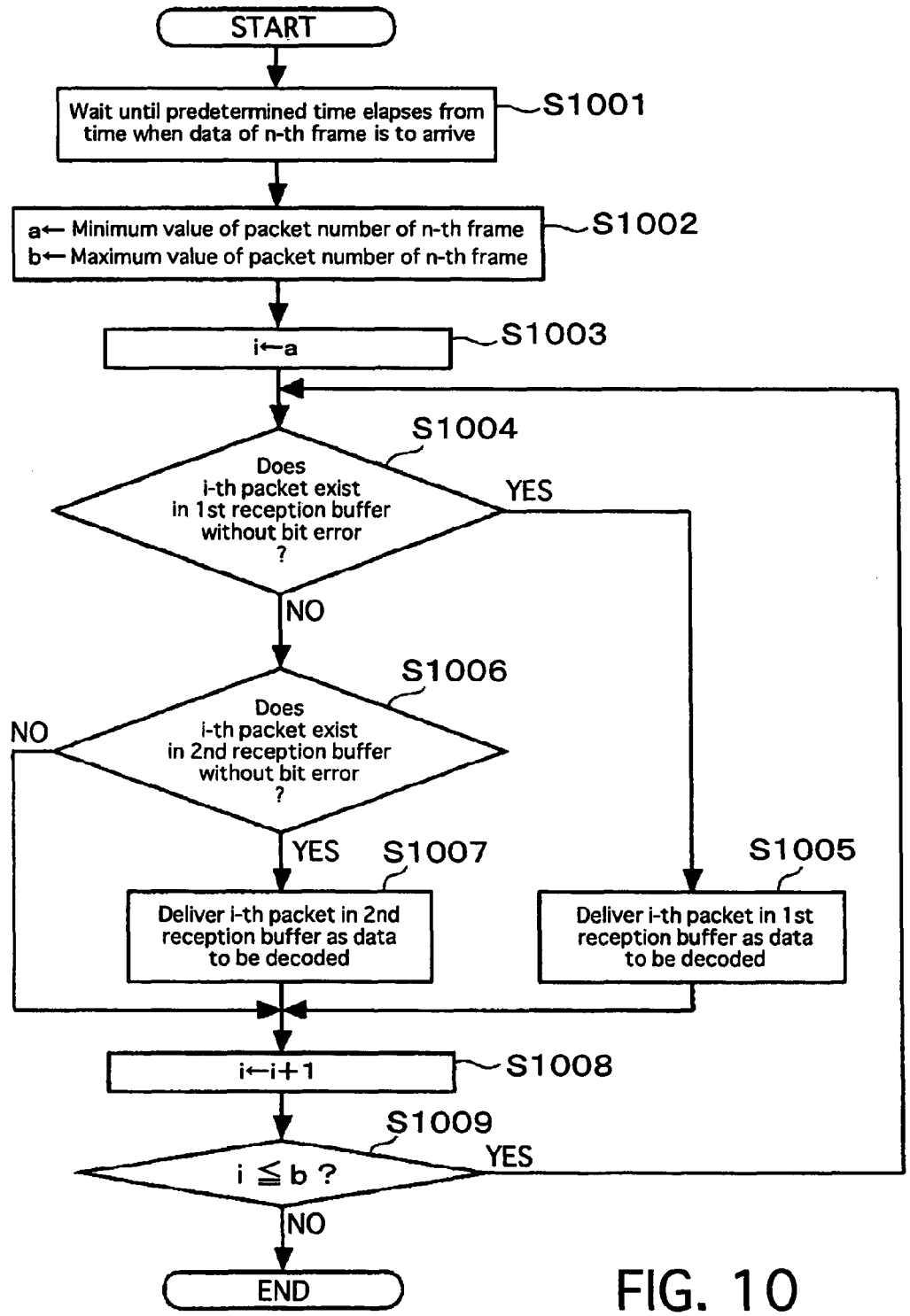
FIG. 10 is a flowchart illustrating an encoded data reconstructing sequence performed by a moving picture code conversion/reception apparatus according to the fourth, sixth, and ninth embodiments.

The operation sequence of encoded data reconstructor 310 according to the present embodiment will be described with reference to a flowchart shown in FIG. 10. The sequence of procedure shown in FIG. 10 represents a sequence for reconstructing the encoded data of an $n^{th}$ frame where n represents an integer.

In step S1001, control waits until a time which is the sum of a time when all encoded data of the $n^{th}$ frame are to arrive at first packet reception buffer 301 and second packet reception buffer 304 and a predetermined allowable maximum delay time. Then, control goes to step S1002.

In step S1002, the minimum value of packet numbers of the $n^{th}$ frame is stored as a variable a for storing a packet number, and the maximum value of packet numbers of the $n^{th}$ frame is stored as a variable b.

In step S1003, the value of the variable a is put into a variable i for storing a packet number. Then, a repetitive sequence from step S1004 is started.

In step S1004, it is determined whether an $i^{th}$ packet of the $n^{th}$ frame exists in first packet reception buffer 301 or not and there is a bit error or not based on the detection result of errors and/or packet losses from first error/packet loss detector 303. If an $i^{th}$ packet of the $n^{th}$ frame is received in first packet reception buffer 301 and no error is detected in the data, then control goes to step S1005. Otherwise, control goes to step S1006.

If control goes to step S1005, the encoded data of the $n^{th}$ frame output from first encoded data extractor 302 is transferred as encoded data to be decoded to variable-length decoder 308. Then, control goes to step S1008.

If control goes to step S1006, then it is determined whether an $i^{th}$ packet of the $n^{th}$ frame exists in second packet reception buffer 304 or not and there is a bit error or not based on the detection result of errors and/or packet losses from second error/packet loss detector 306. If an $i^{th}$ packet of the $n^{th}$ frame is received in second packet reception buffer 304 and no error is detected in the data, then control goes to step S1007. Otherwise, control goes to step S1008.

In step S1007, the encoded data of the $n^{th}$ frame output from second encoded data extractor 305 is transferred as encoded data to be decoded to variable-length decoder 308. Then, control goes to step S1008.

In step S1008, the variable i is incremented by 1. In step S1009 following step S1008, it is determined whether the variable i exceeds the value of the variable b or not. If the variable i does not exceed the value of the variable b, then the processing from step S1004 is repeated. If the variable i exceeds the value of the variable b, then the repetitive sequence is finished, putting the sequence for reconstructing the $n^{th}$ frame encoded data to an end.

Operation and a preferred specific example of other portions of the present embodiment are the same as those of the third embodiment.

(4. D) Advantages:

According to the fourth embodiment of the present invention, the moving picture code conversion/transmission apparatus decodes at least a portion of moving picture data input thereto, encodes the same moving picture data into two encoded data, and transmits the encoded data with time differences that are constant or adaptively changed.

The second moving picture code converter/transmitter encodes an image area included in a packet that has been encoded by the first moving picture code converter/transmitter, using at least one of interframe predictive parameters and predicted residual image data that are obtained by the encoding of that frame with the first moving picture code converter/transmitter.

The code conversion/reception apparatus side selects and outputs encoded data of good image quality, which has the lowest compression ratio, in terms of packets from the encoded data that have been received normally.

As a result, even if transmission paths which tend to suffer frequent transmission errors and packet losses of highly burst nature and are low in reliability are employed, the probability that both of the two encoded data are transmitted in error is reduced, preventing a decoded image produced after the data transmission from being significantly corrupted.

By increasing the compression ratio of the second encoded data, it is possible to reduce an increase in the transmission band owing to the transmission of the second encoded data.

In addition, the first and second encoded data can be transmitted to a plurality of transmission paths having different bands, depending on the situation of the transmission paths and the intention of the moving picture sender or the moving picture recipient, and the influence of errors in the transmission paths can be reduced.

Furthermore, since at least one of the received two encoded data is selected by the moving picture code conversion/reception apparatus and output to the moving picture decoding apparatus by the moving picture code conversion/reception apparatus, the amount of calculations required by the moving picture decoding apparatus is not greatly increased compared with ordinary moving picture decoding apparatus.

In the present embodiment, the code conversion/transmission apparatus and the code conversion/reception apparatus are used in combination with each other. However, no problem will arise if they are used independently of each other. The first to $N^{th}$ code conversion data may be transmitted in an interleaved fashion, rather than at spaced time intervals.

(5) Fifth Embodiment

According to a fifth embodiment of the present invention, a code conversion/transmission apparatus side, where N represents an integer of 2 or more and M represents an integer of 1 or more, has:

(a) a first moving picture code converter/transmitter for being supplied with compressed encoded data, performs compression encoding of all the frames of decoded moving picture data or frames which have adaptively been selected according to the nature of the input moving picture or predetermined rules at a compression ratio equal to or higher than the input encoded data, and controlling transmission, with a predetermining transmitting means, of at least a portion of the encoded data thus obtained;

(b) second to $N^{th}$ moving picture code converter/transmitters for encoding all the frames re-encoded by the first moving picture code converter/transmitter or frames which have adaptively been selected according to the nature of the input moving picture or predetermined rules at a compression ratio equal to or higher than the first moving picture code converter/transmitter, using a reference frame image used in an interframe prediction performed on that frame by the first moving picture code converter/transmitter, and controlling transmission of at least a portion of the obtained encoded data with the same transmission means as or a transmission means different from the transmission means used by the first moving picture code converter/transmitter, with constant or adaptively changing transmission time differences; and (c) a mechanism for selecting compression ratios of first to $N^{th}$ moving picture code converter/transmitters and/or the number of encoded data to be transmitted depending on bands that can be used by first to $M^{th}$ transmission paths, and transmitting the encoded data to the first to $M^{th}$ transmission paths.

The code conversion/reception apparatus side comprises a selector for selecting at least one transmission path from the M transmission paths, receiving N encoded data from the selected transmission path, extracting encoded data which have been received free of transmission errors or losses, and selecting and outputting encoded moving picture data of good image quality, which has the lowest compression ratio, for example, from the encoded data in the same frame.

The components of the code conversion/transmission apparatus and the code conversion/reception apparatus have their processing and function realized by a program that is executable by a computer serving as the code conversion/transmission apparatus and the code conversion/reception apparatus.

The fifth embodiment will be described in greater detail below:

(5-A) General:

An arrangement and operation of the system according to the present embodiment are substantially the same as those of the third embodiment. As shown in FIG. 7, the present embodiment comprises a code conversion/transmission apparatus for moving picture data, a code conversion/reception apparatus, and transmission paths for transmitting encoded data. The integer N represents the number of encoded data transmitted by the code conversion/transmission apparatus, and is 2 or more. The integer M represents the number of transmission paths to which N encoded data are sent, and is 1 or more.

The code conversion/transmission apparatus has an arrangement which is substantially the same as that of the third embodiment, but slightly differs therefrom as to operation of various components of the apparatus. Only the differences will be described below, with the description of identical portions being omitted.

Second to $N^{th}$ moving picture encoder/transmitters decode at least a portion of encoded moving picture data input thereto, perform a predetermined compression encoding process of the obtained image at a compression ratio equal to or higher than the input moving picture data, and transmit at least a portion of the code conversion data to the moving picture code conversion/reception apparatus. In the second to $N^{th}$ moving picture encoder/transmitters, the input frame image is encoded using a reference frame image used in an interframe prediction performed on that frame by the first moving picture encoder/transmitter. Alternatively, interframe predictive parameters and predicted differential image data that are different from those in the first moving picture encoder/transmitter, obtained by an interframe prediction performed under different control from the first moving picture encoder/transmitter, may be encoded. Other operational details are essentially the same as those of the third embodiment.

Figure 11:
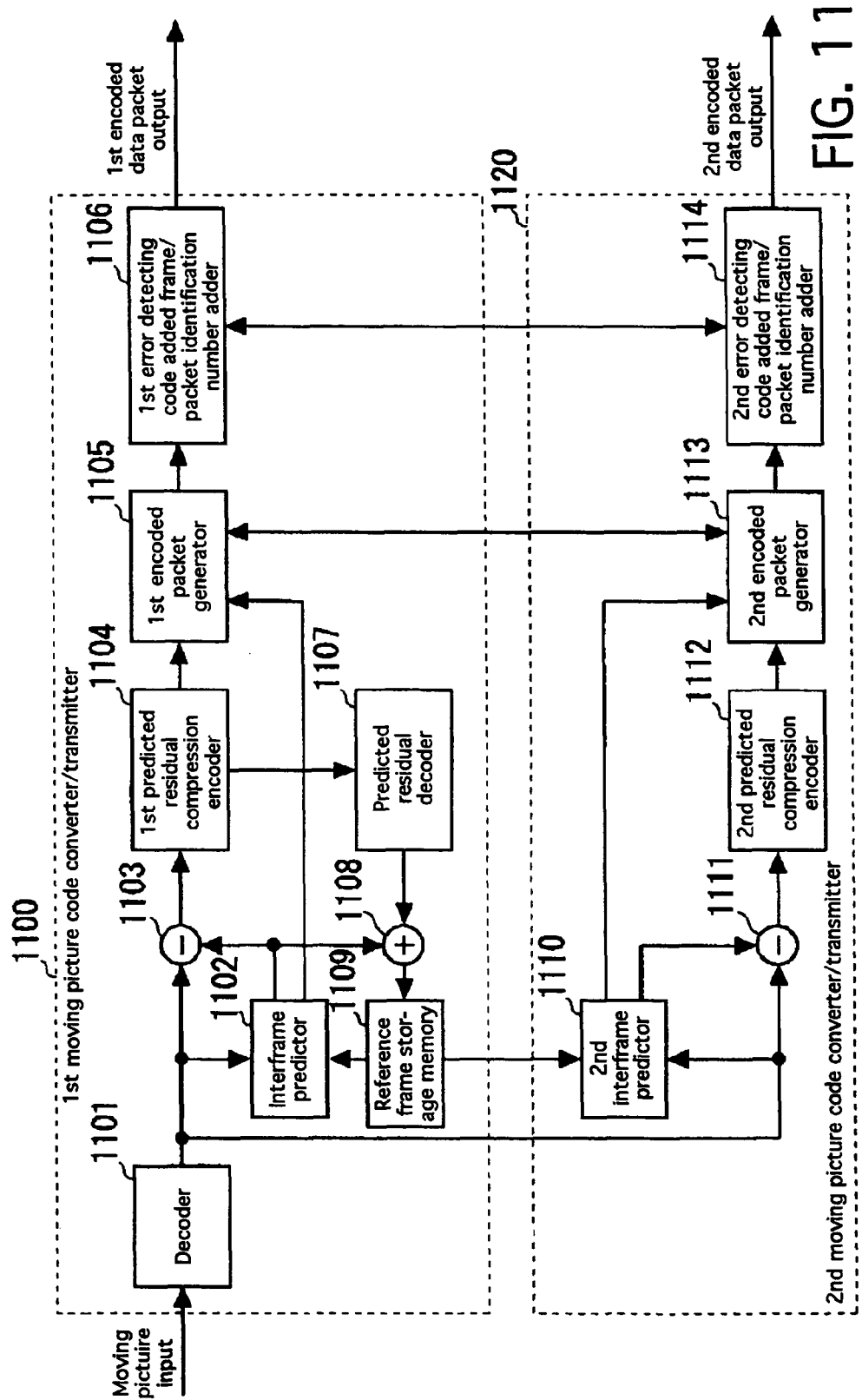
FIG. 11 is a block diagram illustrating an arrangement of a moving picture code conversion/transmission apparatus according to the fifth and sixth embodiments

(5. B) Code Conversion/transmission Apparatus:

FIG. 11 shows a detailed arrangement of a moving picture code conversion/transmission apparatus according to the fifth embodiment. For the sake of brevity, it is assumed that the number N of encoded data output from the apparatus is 2. In FIG. 11, the reference numerals 1101 to 1109 represent processors of the first moving picture encoder/transmitter of the moving picture code conversion/transmission apparatus according to the present embodiment. These processors operate in the same manner as the processors of the first moving picture code converter/transmitter shown in FIG. 8. In FIG. 11, interframe predictor 1110, predicted residual calculator 1111, second predicted residual compression encoder 1112, and second encoded packet generators 1113, 1114 serve as processors of the second moving picture encoder/transmitter of the moving picture code conversion/transmission apparatus according to the present embodiment. However, these processors operate differently from the moving picture encoder/transmitter according to the first embodiment.

Interframe predictor 1110 performs an interframe prediction on an input image input from decoder 1101 from at least one decoded image that is stored in reference frame storage memory 1109. Predicted residual calculator 1111 calculates a predicted residual by subtracting a predicted image produced by interframe predictor 1110 from a frame image that is input thereto. Second predicted residual compression encoder 1112 encodes a predicted residual image obtained by predicted residual calculator 1111 at a compression ratio equal to or higher than first predicted residual compression encoder 1104. Second encoded packet generator 1113 converts an interframe predictive parameter obtained by interframe predictor 1110 and compressed data of a predicted residual image obtained by second predicted residual compression encoder 1112 into a bit stream according to variable length coding, and outputs the bit stream in terms of predetermined packets. Second error detecting code added frame/packet identification number adder 1114 adds an error detecting code and a frame/packet identification number for the reception apparatus to detect a transmission error and a packet loss of compressed packet data that are output from second encoded packet generator 1113. The above processors operate to produce second encoded moving picture data, which are transmitted in terms of packets by a predetermined transmitting means.

(5. C) Advantages:

According to the fifth embodiment of the present invention, the moving picture code conversion/transmission apparatus decodes at least a portion of moving picture data input thereto, encodes the same moving picture data into two encoded data, and transmits the encoded data with time differences that are constant or adaptively changed.

The second moving picture code converter/transmitter encodes a frame that has been encoded by the first moving picture code converter/transmitter, using a reference frame image used in the encoding of the frame with the first moving picture code converter/transmitter.

The code conversion/reception apparatus side selects and outputs encoded data of good image quality, which has the lowest compression ratio, in terms of frames from the encoded data that have been received normally.

As a result, even if transmission paths which tend to suffer frequent transmission errors and packet losses of highly burst nature and are low in reliability are employed, the probability that both of the two encoded data are transmitted in error is reduced, preventing a decoded image produced after the data transmission from being significantly corrupted.

By increasing the compression ratio of the second encoded data, it is possible to reduce an increase in the transmission band owing to the transmission of the second encoded data.

In addition, the first and second encoded data can be transmitted to a plurality of transmission paths having different bands, depending on the situation of the transmission paths and the intention of the moving picture sender or the moving picture recipient, and the influence of errors in the transmission paths can be reduced.

Furthermore, since at least one of the received two encoded data is selected by the moving picture code conversion/reception apparatus and output to the moving picture decoding apparatus by the moving picture code conversion/reception apparatus, the amount of calculations required by the moving picture decoding apparatus is not greatly increased compared with ordinary moving picture decoding apparatus.

In the present embodiment, the code conversion/transmission apparatus and the code conversion/reception apparatus are used in combination with each other. However, no problem will arise if they are used independently of each other. The first to $N^{th}$ code conversion data may be transmitted in an interleaved fashion, rather than at spaced time intervals.

(6) Sixth Embodiment

According to a sixth embodiment of the present invention, a code conversion/transmission apparatus side, where N represents an integer of 2 or more and M represents an integer of 1 or more, has:

(a) a first moving picture code converter/transmitter for being supplied with compressed encoded packet data, performing compression encoding of decoded moving picture data at a compression ratio equal to or higher than the input moving picture data, and controlling transmission, with a predetermining transmitting means, of at least a portion of the encoded packet data thus obtained;

(b) second to $N^{th}$ moving picture code converter/transmitters for encoding an image area encoded by each of all packet data encoded by the first moving picture code converter/transmitter or packet data which have adaptively been selected according to the nature of the input moving picture or predetermined rules, into packet data at a compression ratio equal to or higher than the first moving picture code converter/transmitter, using a reference frame image used in an interframe prediction performed on that image area by the first moving picture code converter/transmitter, and controlling transmission of at least a portion of the obtained encoded data with constant or adaptively changing time differences, with a predetermined transmitting means; and (c) a mechanism for selecting compression ratios of first to $N^{th}$ moving picture code converter/transmitters and/or the number of encoded data to be transmitted depending on bands that can be used by first to $M^{th}$ transmission paths, and transmitting the encoded data to the first to $M^{th}$ transmission paths.

The code conversion/reception apparatus side comprises a selector for selecting at least one transmission path from the M transmission paths, receiving N encoded data from the selected transmission path, and selecting and outputting encoded packet data of good image quality, which has the lowest compression ratio, for example, from the encoded packet data produced by encoding an image in the same area in the same frame.

The components of the code conversion/transmission apparatus and the code conversion/reception apparatus have their processing and function realized by a program that is executable by a computer serving as the code conversion/transmission apparatus and the code conversion/reception apparatus.

The sixth embodiment will be described in greater detail below:

(6. A) General:

A system arrangement according to the present embodiment are substantially the same as that of the fifth embodiment. As shown in FIG. 7, the present embodiment comprises a code conversion/transmission apparatus for moving picture data, a code conversion/reception apparatus, and transmission paths for transmitting encoded data. The integer N represents the number of encoded data transmitted by the code conversion/transmission apparatus, and is 2 or more. The integer M represents the number of transmission paths to which N encoded data are sent, and is 1 or more.

The moving picture code conversion/transmission apparatus has an arrangement which is substantially the same as that of the fifth embodiment, but slightly differs therefrom as to operation of various components of the apparatus. Only the differences will be described below.

A first moving picture encoder/transmitter decodes at least a portion of encoded moving picture data input thereto and encodes the obtained image at a compression ratio equal to or higher than the input moving picture data. Encoded data of an input frame image that is encoded by the first moving picture encoder/transmitter comprises at least one packet data, each packet data including encoded interframe predictive parameters and encoded compressed differential image data with respect to an image area included in the input frame image. The second to $N^{th}$ moving picture encoder/transmitters encode an image area included in at least one of packets encoded by the first moving picture encoder/transmitter, at a compression ratio equal to or higher than the first moving picture encoder/transmitter, using a reference frame image used in an interframe prediction performed on that image area by the first moving picture encoder/transmitter, and transmits at least a portion of the encoded packet data thus obtained to the moving picture code conversion/reception apparatus. Other operational details are essentially the same as those of the fifth embodiment.

An arrangement and operation of the code conversion/reception apparatus according to the sixth embodiment of the present invention are the same as those of the fourth embodiment, and are different from those of the fifth embodiment.

(6. B) Code Conversion/Transmission Apparatus:

An arrangement and operation of the code conversion/transmission apparatus according to the present embodiment are substantially the same as those of the code conversion/transmission apparatus according to the fifth embodiment shown in FIG. 9, except that only operation of first encoded packet generator 1105, second encoded packet generator 1113, first error detecting code added frame/packet number adder 1106, and second error detecting code added frame/packet number adder 1114 is different. The differences with the fifth embodiment will be described below.

In the moving picture data code conversion/transmission apparatus according to the present embodiment, first encoded packet generator 1105 and second encoded packet generator 1113 generate encoded packet data such that an image area included in encoded packet data generated by first encoded packet generator 1105 and an image area includes in encoded packet data generated by second encoded packet generator 1113 coincide with each other.

First error detecting code added frame/packet number adder 1106 and second error detecting code added frame/packet number adder 1114 operate to add the same packet identification number to encoded packet data corresponding to the same image area in the same frame. If packet data generated by the first and second encoded packet generators include frame numbers and information for specifying the position of an image area included in the packet data, then no frame/packet identification number may be added.

(6. C) Advantages:

According to the sixth embodiment described above, the moving picture code conversion/transmission apparatus decodes at least a portion of moving picture data input thereto, encodes the same moving picture data into two encoded data, and transmits the encoded data with time differences that are constant or adaptively changed.

The second moving picture code converter/transmitter encodes an image area included in a packet that has been encoded by the first moving picture code converter/transmitter, using a reference frame image used in the encoding of the frame with the first moving picture code converter/transmitter. The code conversion/reception apparatus side selects and outputs encoded data of good image quality, which has the lowest compression ratio, in terms of packets from the encoded data that have been received normally.

As a result, even if transmission paths which tend to suffer frequent transmission errors and packet losses of highly burst nature and are low in reliability are employed, the probability that both of the two encoded data are transmitted in error is reduced, preventing a decoded image produced after the data transmission from being significantly corrupted.

By increasing the compression ratio of the second encoded data, it is possible to reduce an increase in the transmission band owing to the transmission of the second encoded data. In addition, the first and second encoded data can be transmitted to a plurality of transmission paths having different bands, depending on the situation of the transmission paths and the intention of the moving picture sender or the moving picture recipient, and the effect of errors in the transmission paths can be reduced.

Furthermore, since at least one of the received two encoded data is selected by the moving picture code conversion/reception apparatus and output to the moving picture decoding apparatus by the moving picture code conversion/reception apparatus, the amount of calculations required by the moving picture decoding apparatus is not greatly increased compared with ordinary moving picture decoding apparatus.

In the present embodiment, the code conversion/transmission apparatus and the code conversion/reception apparatus are used in combination with each other. However, no problem will arise if they are used independently of each other. The first to $N^{th}$ code conversion data may be transmitted in an interleaved fashion, rather than at spaced time intervals.

(7) Seventh Embodiment

According to a seventh embodiment of the present invention, a code conversion/transmission apparatus, where N represents an integer of 2 or more and M represents an integer of 1 or more, has:

(a) a first moving picture code converter/transmitter for being supplied with encoded packet data and controlling transmission of data with a predetermined transmitting means;

(b) second to $N^{th}$ moving picture code converter/transmitters for duplicating packets of all the packet data encoded by the first moving picture code converter/transmitter or packet data which have adaptively been selected according to the nature of the input moving picture or predetermined rules, and controlling transmission of at least a portion of the obtained packet data with constant or adaptively changing transmission time differences, with the same transmitting means as or a transmitting means different from the transmitting means used by the first moving picture code converter/transmitter; and (c) a mechanism for selecting the number of encoded data to be transmitted by the first to $N^{th}$ moving picture code converter/transmitters depending on bands that can be used by first to $M^{th}$ transmission paths, and transmitting the encoded data to the first to $M^{th}$ transmission paths.

The code conversion/reception apparatus sides comprises a selector for selecting at least one transmission path from the M transmission paths, receiving N encoded data from the selected transmission path, and selecting and outputting encoded packet data which have been received free of transmission errors or losses, e.g., encoded packet data that have been recorded normally at first, from the encoded packet data produced by encoding an image in the same area in the same frame.

The components of the code conversion/transmission apparatus and the code conversion/reception apparatus have their processing and function realized by a program that is executable by a computer serving as the code conversion/transmission apparatus and the code conversion/reception apparatus.

Figure 12:
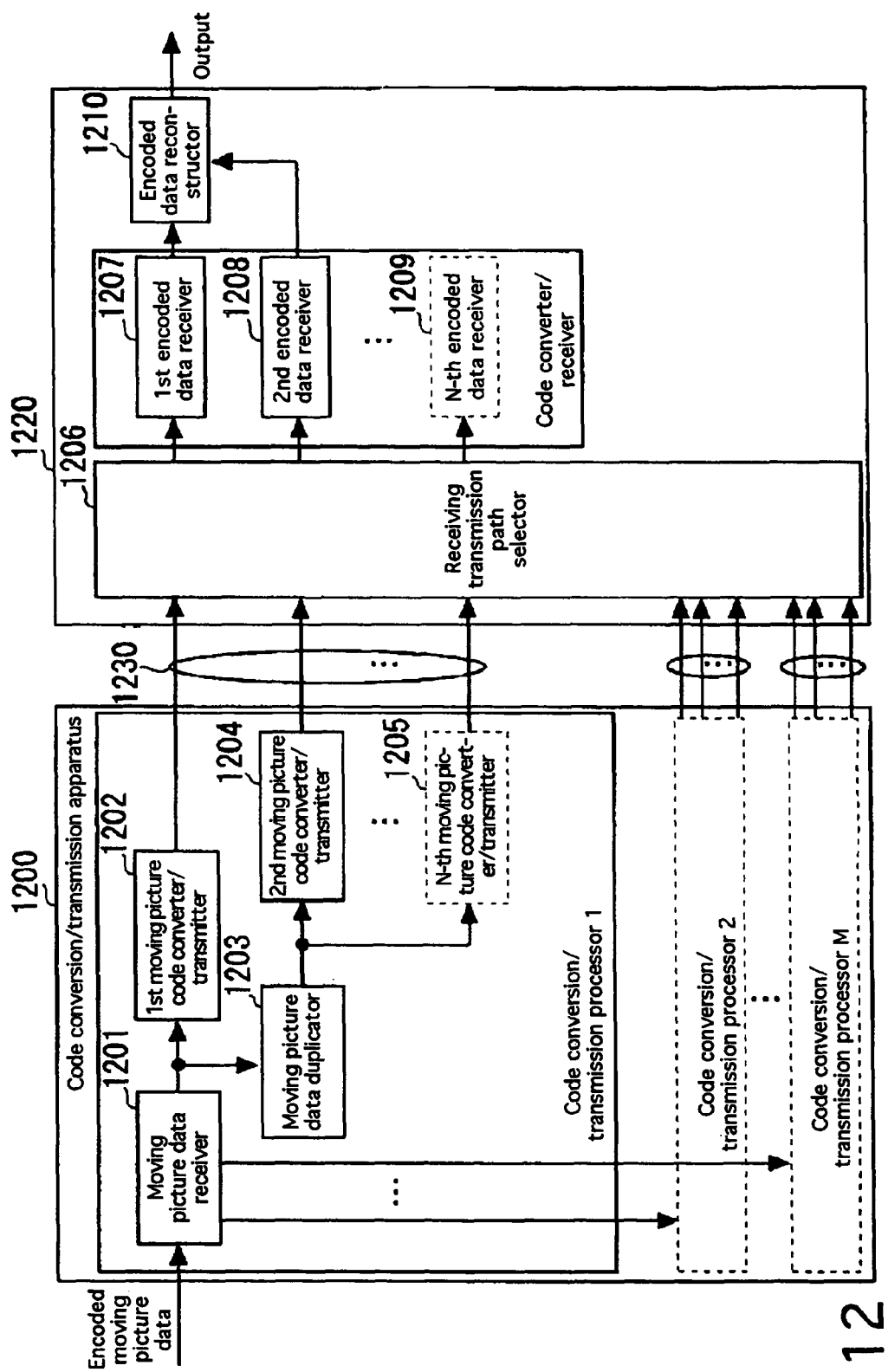
FIG. 12 is a block diagram illustrating an arrangement of a code conversion/transmission system according to a seventh embodiment of the present invention.

The seventh embodiment will be described in greater detail below:

(7. A) General:

FIG. 12 shows an arrangement of a system according to the seventh embodiment of the present invention. As shown in FIG. 12, the system according to the seventh embodiment comprises code conversion/transmission apparatus 1200 for moving picture data, code conversion/reception apparatus 1220, and transmission paths 1230 for transmitting encoded data. The integer N represents the number of encoded data transmitted by the code conversion/transmission apparatus, and is 2 or more. The integer M represents the number of transmission paths 1230 to which N encoded data are sent, and is 1 or more.

Code conversion/transmission apparatus 1200 is supplied with moving picture packet data, selects at least a portion of the moving picture packet data, and sends the selected data to first to $M^{th}$ transmission paths 1230.

As shown in FIG. 12, apparatus 1200 has first to $N^{th}$ N moving picture code converter/transmitters 1202 to 1205 for transmitting encoded moving picture packet data to the first to $M^{th}$ M transmission paths. Moving picture data receiver 1201 receives moving picture packet data. First moving picture code converter/transmitter 1202 sends at least one packet of moving picture packet data input thereto to code conversion/reception apparatus 1220. Moving picture data duplicator 1203 duplicates a received packet and outputs duplicated packets to second to $N^{th}$ moving picture code converter/transmitters 1204, 1205. Second to $N^{th}$ moving picture code converter/transmitters 1204, 1205 send at least one of the duplicated packets to code conversion/reception apparatus 1220. Of the first to $N^{th}$ encoded moving picture data, encoded data selected depending on the bands that can be used by the transmission paths are transmitted to first to $M^{th}$ transmission paths 1230.

In moving picture code conversion/reception apparatus 1220, receiving transmission path selector 1206 selects at least one transmission path from the M transmission paths to which the code conversion/transmission apparatus has sent encoded data. Moving picture code conversion/reception apparatus 1220 receives N encoded data from the selected transmission path, and decodes and converts the received data.

As shown in FIG. 12, moving picture code conversion/reception apparatus 1220 comprises first to $N^{th}$ encoded data receivers 1207 to 1209 for receiving encoded data transmitted by first to $N^{th}$ N moving picture code converter/transmitters 1202 to 1205 of code conversion/transmission apparatus 1200, and encoded data reconstructor 1210.

Encoded data reconstructor 1210 selects and outputs data from a maximum of N encoded data which have been received free of transmission errors and losses by encoded data receivers 1207 to 1209. Since the maximum of N encoded data have the same compression ratio, encoded data reconstructor 1210 selects and outputs encoded data that have been received normally at first, for example.

Figure 13:
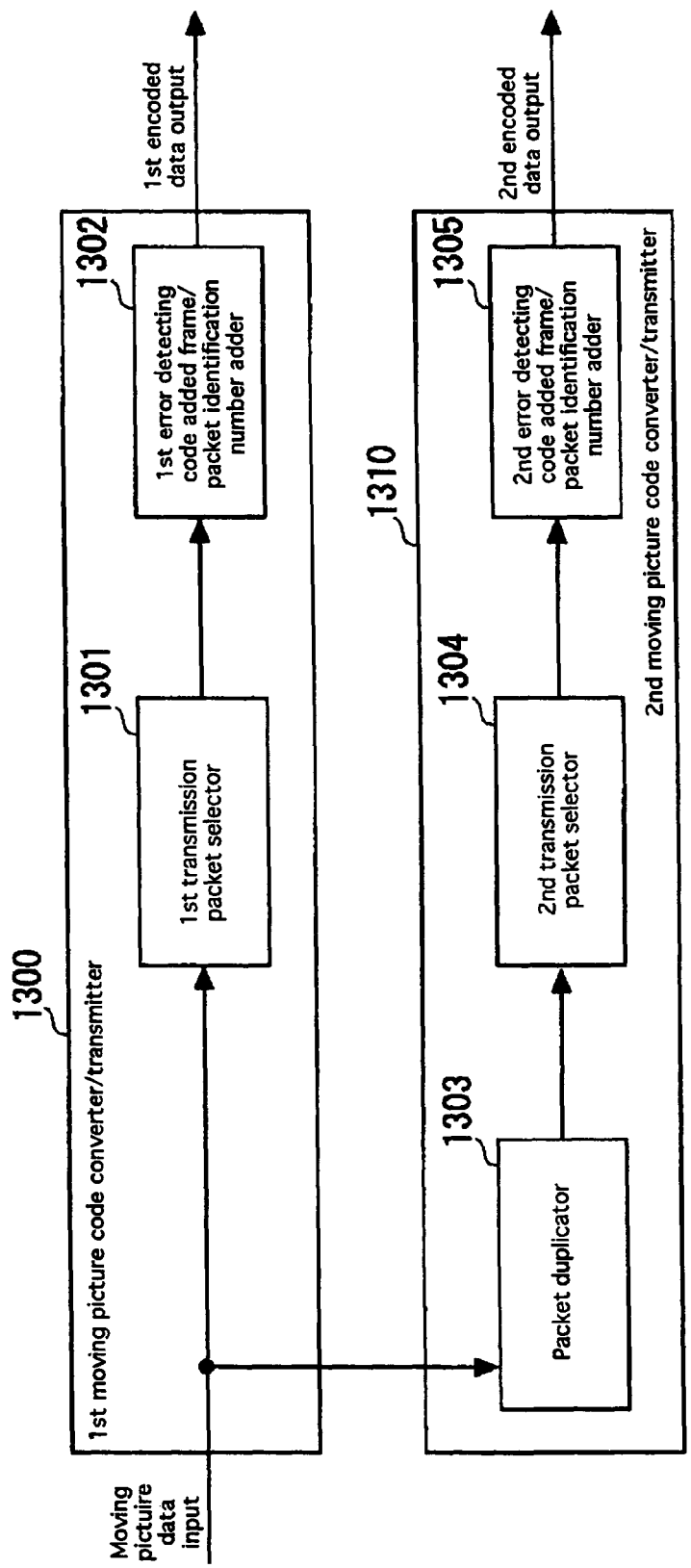
FIG. 13 is a block diagram illustrating an arrangement of a moving picture code conversion/transmission apparatus in the system shown in FIG. 12.

(7. B) Code Conversion/transmission Apparatus:

FIG. 13 shows a detailed arrangement of moving picture code conversion/transmission apparatus 1200 (see FIG. 7) according to the seventh embodiment. For the sake of brevity, it is assumed that the number N of encoded data output from the moving picture code conversion/transmission apparatus is 3 and the number M of transmission paths for transmitting encoded data is 2.

In FIG. 13, first transmission packet selector 1301 of first moving picture code converter/transmitter 1300 selects packets to be transmitted adaptively depending on the nature of images and the situation of transmission paths, from moving picture packet data input thereto. For example, first transmission packet selector 1301 may select and send packets in each constant period (once per n packets). Alternatively, first transmission packet selector 1301 refers to a characteristic parameter in packets of moving picture frames, and adaptively determines selected and encoded packets to be transmitted. For example, first transmission packet selector 1301 may refer to a parameter, e.g., a motion vector, which largely affects the quality of decoded images due to a bit error or a packet loss, as a characteristic parameter in encoded packets, and adaptively determines encoded packets to be transmitted. Alternatively, if the encoding process is an MPEG scheme, then first transmission packet selector 1301 may select packets according to a rule (which may be dynamically changed) for necessarily selecting an I picture, for example.

First error detecting code added frame/packet identification number adder 1302 adds an error detecting code and a frame/packet identification number for the reception apparatus to detect a transmission error and a packet loss of encoded packet data that are output.

In FIG. 13, packet duplicator 1303 of second moving picture code converter/transmitter 1310 duplicates encoded moving picture packet data input thereto.

Second transmission packet selector 1304 selects the same number of packets as, or a different number of packets from, those in the first moving picture code converter/transmitter, which are to be adaptively transmitted depending on the nature of images and the situation of transmission paths. If a different number of packets are to be selected, then second transmission packet selector 1304 may select them based on the relationship (rule) of a characteristic parameter such as a motion vector and its threshold. Alternatively, if the encoding process is an MPEG scheme, then second transmission packet selector 1304 may select packets according to a rule for necessarily selecting an I picture, for example.

Second error detecting code added frame/packet identification number adder 1305 adds an error detecting code and a frame/packet identification number for the reception apparatus to detect a transmission error and a packet loss of encoded packet data that are output by selector 1304.

In the present embodiment, since M is 2 and N is 3, encoded moving picture data selected depending on the bands that can be used by transmission paths from the above first and second encoded moving picture data are transmitted to each of the two transmission paths.

Operation of the other processors than described above is the same as with the fourth embodiment.

A preferred specific example of the present embodiment is the same as that of the second embodiment. An arrangement and operation of the moving picture code conversion/reception apparatus are the same as those of the fourth embodiment.

(7. C) Advantages:

According to the seventh embodiment described above, the moving picture code conversion/transmission apparatus converts the same moving picture packet data into two encoded data, and transmits the encoded data with time differences that are constant or adaptively changed.

The first moving picture code converter/transmitter adaptively selects input moving picture packet data according to the nature of moving pictures or a predetermined rule, and outputs the selected moving picture packet data. The second moving picture code converter/transmitter duplicates input moving picture packet data, and selects and transmits at least a portion of the duplicated moving picture packet data.

The code conversion/reception apparatus side selects, in terms of packets, data free of errors and losses from encoded packet data that have been received normally and selects data that have arrived at first, for example, from the data received from the two transmission paths, and outputs the selected data.

As a result, even if transmission paths which tend to suffer frequent transmission errors and packet losses of highly burst nature and are low in reliability are employed, the probability that both of the two encoded data are transmitted in error is reduced, preventing a decoded image produced after the data transmission from being significantly corrupted.

By reducing the number of selected second encoded packet data, it is possible to reduce an increase in the transmission band owing to the transmission of the second encoded data.

In addition, the first and second encoded data can be transmitted to a plurality of transmission paths having different bands, depending on the situation of the transmission paths and the intention of the moving picture sender or the moving picture recipient, and the influence of errors in the transmission paths can be reduced.

Furthermore, since at least one of the received two encoded data is selected by the moving picture code conversion/reception apparatus and output to the moving picture decoding apparatus by the moving picture code conversion/reception apparatus, the amount of calculations required by the moving picture decoding apparatus is not greatly increased compared with ordinary moving picture decoding apparatus.

In the present embodiment, the code conversion/transmission apparatus and the code conversion/reception apparatus are used in combination with each other. However, no problem will arise if they are used independently of each other. The first to $N^{th}$ code conversion data may be transmitted in an interleaved fashion, rather than at spaced time intervals.

(8) Eighth Embodiment

According to an eighth embodiment of the present invention, a code conversion/transmission apparatus side, where N represents an integer of 2 or more and M represents an integer of 1 or more, has:

(a) a first moving picture code converter/transmitter for being supplied with compressed encoded packet data, decoding at least a portion of the input encoded data, performing compression encoding of the data at a compression ratio equal to or higher than the input moving picture data, and controlling transmission, with a predetermining transmitting means, of all the frames or frames which have adaptively been selected according to the nature of the input moving picture or predetermined rules;

(b) second to $N^{th}$ moving picture code converter/transmitters for decoding at least a portion of the input encoded data, performing compression encoding of the data at a compression ratio equal to or higher than the first moving picture code converter/transmitter, and controlling transmission of all the frames of the encoded data that are obtained or frames which have adaptively been selected according to the nature of the input moving picture or predetermined rules, with constant or adaptively changing transmission time differences, with the same transmitting means as or a transmitting means different from the transmitting means used by the first moving picture code converter/transmitter; and (c) a mechanism for selecting compression ratios of first to $N^{th}$ moving picture code converter/transmitters and/or the number of encoded data to be transmitted depending on bands that can be used by first to $M^{th}$ transmission paths, and transmitting the encoded data to the first to $M^{th}$ transmission paths.

The code conversion/reception apparatus side comprises a selector for selecting at least one transmission path from the M transmission paths, receiving N encoded data from the selected transmission path, extracting encoded data that are received free of transmission errors or losses, and selecting and outputting encoded moving picture data of good image quality, which has the lowest compression ratio, for example, from the encoded data in the same frame.

The components of the code conversion/transmission apparatus and the code conversion/reception apparatus have their processing and function realized by a program that is executable by a computer serving as the code conversion/transmission apparatus and the code conversion/reception apparatus.

Figure 14:
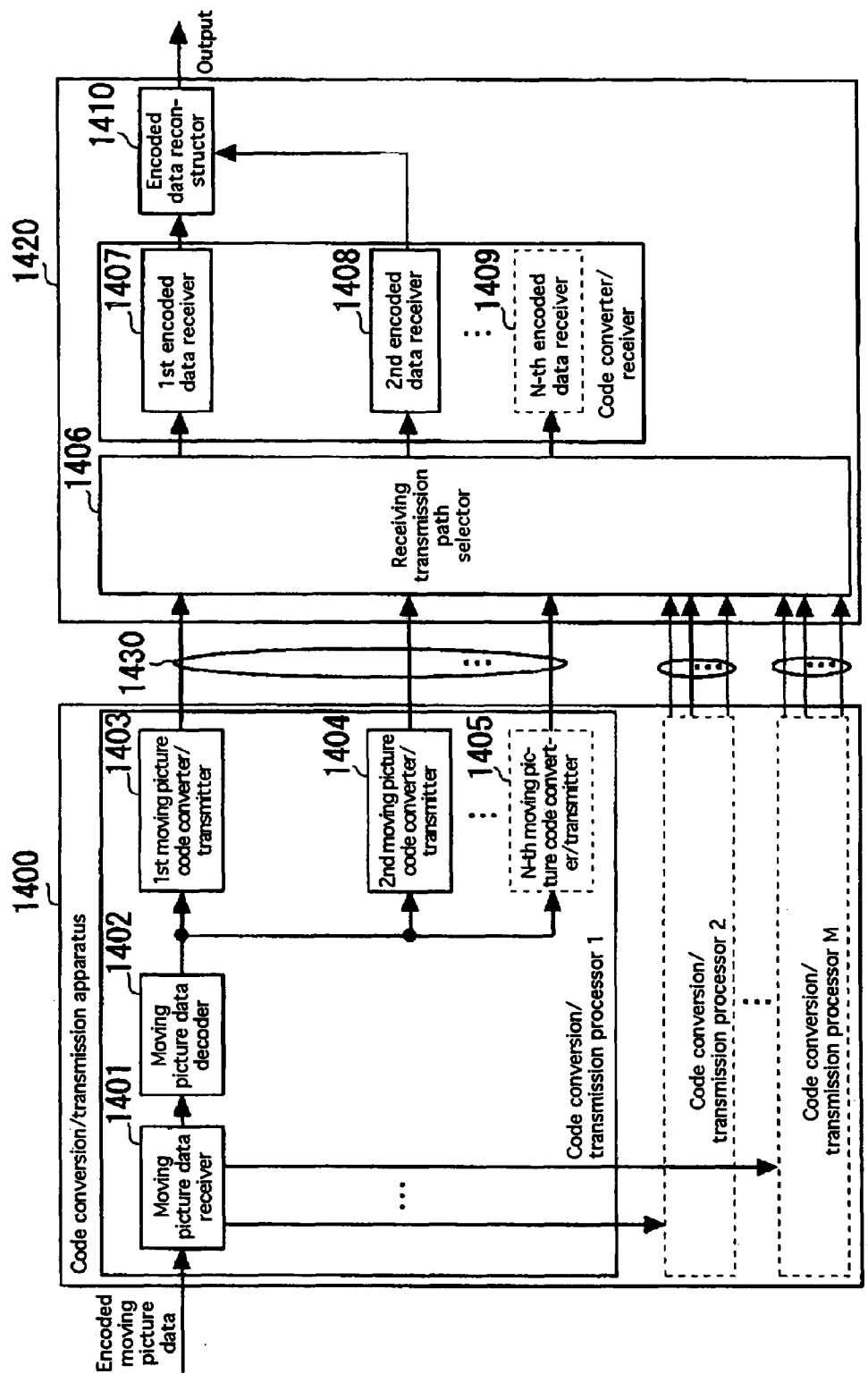
FIG. 14 is a block diagram illustrating an arrangement of a code conversion/transmission system according to eighth and ninth embodiments of the present invention.

The eighth embodiment will be described in greater detail below:

(8. A) General:

FIG. 14 shows an arrangement of a system according to the eighth embodiment of the present invention. As shown in FIG. 14, the system comprises code conversion/transmission apparatus 1400 for moving picture data, code conversion/reception apparatus 1420, and transmission paths 1430 for transmitting encoded data. The integer N represents the number of encoded data transmitted by the code conversion/transmission apparatus, and is 2 or more. The integer M represents the number of transmission paths 1430 to which N encoded data are sent, and is 1 or more.

Code conversion/transmission apparatus 1400 decodes at least a portion of encoded moving picture data input thereto, performs a predetermined compression encoding process of the obtained image at a compression ratio equal to or higher than the input data, and sends at least a portion of the code conversion data to the moving picture code conversion/reception apparatus. Code conversion/transmission apparatus 1400 encodes the input moving picture data into N encoded data, and sends the encoded data as first to $N^{th}$ encoded moving picture data to first to $M^{th}$ transmission paths. As shown in FIG. 14, the apparatus has first to $N^{th}$ N moving picture code converter/transmitters 1403 to 1405.

Moving picture data receiver 1401 receives moving picture data. Moving picture decoder 1402 decodes at least a portion of encoded moving picture data input thereto. First moving picture code converter/transmitter 1403 performs a predetermined compression encoding process of frames input to the code conversion/transmission apparatus according to a predetermined compression process, and sends at least a portion of the encoded data thus obtained to code conversion/reception apparatus 1420. Second to $N^{th}$ moving picture code converter/transmitters 1403 to 1405 encodes input frames at a compression ratio equal to or higher than first moving picture code converter/transmitter 1403, and send at least a portion of the encoded data thus obtained to code conversion/reception apparatus 1420. Of the first to $N^{th}$ encoded moving picture data, encoded data selected depending on the bands that can be used by the transmission paths are transmitted to first to $M^{th}$ transmission paths 1430.

In moving picture code conversion/reception apparatus 1430, receiving transmission path selector 1406 selects at least one transmission path from the M transmission paths to which the moving picture code conversion/transmission apparatus has sent encoded data. Moving picture code conversion/reception apparatus 1400 receives N encoded data from the selected transmission path, and decodes and converts the received data.

As shown in FIG. 14, moving picture code conversion/reception apparatus 1430 comprises first to $N^{th}$ encoded data receivers 1407 to 1409 for receiving encoded data transmitted by first to $N^{th}$ N moving picture code converter/transmitters 1403 to 1405 of code conversion/transmission apparatus 1400, and encoded data reconstructor 1410.

Encoded data reconstructor 1410 selects and outputs data of good image quality, which has the lowest compression ratio, for example, from a maximum of N encoded data which have been received free of transmission errors and losses by encoded data receivers 1407 to 1409.

Figure 15:
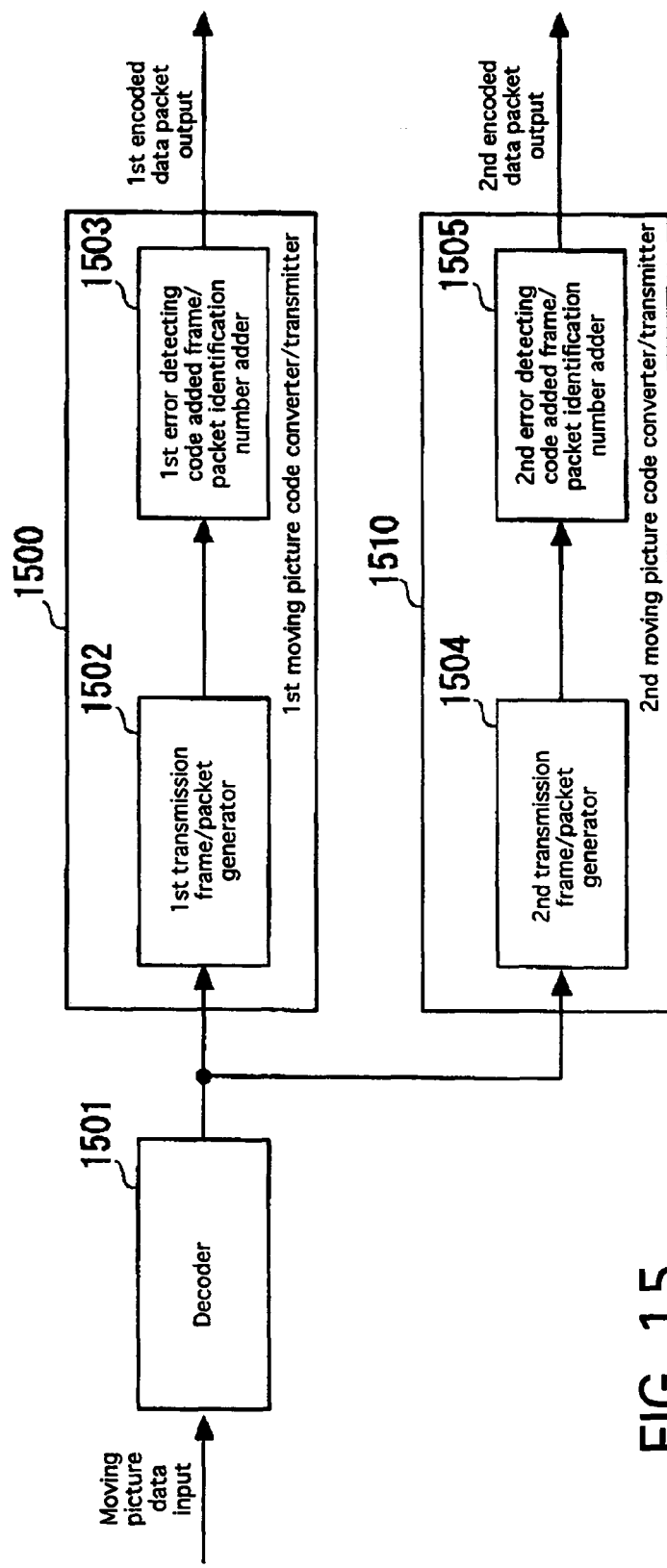
FIG. 15 is a block diagram illustrating an arrangement of a moving picture code conversion/transmission apparatus in the system shown in FIG. 14.

(8. B) Code Conversion/transmission Apparatus:

FIG. 15 shows a detailed arrangement of moving picture code conversion/transmission apparatus 1400 (see FIG. 14) according to the eighth embodiment of the present invention. For the sake of brevity, it is assumed that the number N of encoded data output from the moving picture code conversion/transmission apparatus is 2 and the number M of transmission paths for transmitting encoded data is 2.

As shown in FIG. 15, decoder 1501 decodes at least a portion of moving picture data input thereto. First transmission frame/packet generator 1502 of first moving picture code converter/transmitter 1500, which is shown as first moving picture code converter/transmitter 1403 in FIG. 14, encodes the decoded moving picture data at a compression ratio equal to or higher than the input data, and outputs the encoded data to first error detecting code added frame/packet identification number adder 1503. First error detecting code added frame/packet identification number adder 1503 adds an error detecting code and a frame/packet identification number for the reception apparatus to detect a transmission error and a packet loss of encoded packet data that are output by first transmission frame/packet generator 1502. In this manner, first encoded moving picture data are obtained, and transmitted by a predetermined transmitting means. Similarly, as shown in FIG. 15, second transmission frame/packet generator 1504 of second moving picture code converter/transmitter 1510, which is shown as first moving picture code converter/transmitter 1404 in FIG. 14, encodes the data at a compression ratio equal to or higher than first moving picture code converter/transmitter 1500, and outputs the encoded data to second error detecting code added frame/packet identification number adder 1505. Second error detecting code added frame/packet identification number adder 1505 adds an error detecting code and a frame/packet identification number for the reception apparatus to detect a transmission error and a packet loss of encoded packet data that are output by second transmission frame/packet generator 1504. In this manner, second encoded moving picture data are obtained, and transmitted by a predetermined transmitting means.

In the present embodiment, since M is 2 and N is 2, the above first and second encoded moving picture code conversion/transmission data are transmitted to each of the two transmission paths.

Operation of the other processors than described above is the same as with the third embodiment.

A preferred specific example of the present embodiment is the same as that of the first embodiment. An arrangement and operation of the moving picture code conversion/reception apparatus are the same as those of the third embodiment.

(8. C) Advantages:

According to the present embodiment, the moving picture code conversion/transmission apparatus decodes at least a portion of moving picture data input thereto, encodes the same moving picture data into two encoded data, and transmits the encoded data with time differences that are constant or adaptively changed.

The code conversion/reception apparatus side selects and outputs encoded data of good image quality, which has the lowest compression ratio, in terms of frames from the encoded data that have been received normally.

As a result, even if transmission paths which tend to suffer frequent transmission errors and packet losses of highly burst nature and are low in reliability are employed, the probability that both of the two encoded data are transmitted in error is reduced, preventing a decoded image produced after the data transmission from being significantly corrupted.

By increasing the compression ratio of the second encoded data, it is possible to reduce an increase in the transmission band owing to the transmission of the second encoded data.

In addition, the first and second encoded data can be transmitted to a plurality of transmission paths having different bands, depending on the situation of the transmission paths and the intention of the moving picture sender or the moving picture recipient, and the influence of errors in the transmission paths can be reduced.

Furthermore, since at least one of the received two encoded data is selected by the moving picture code conversion/reception apparatus and output to the moving picture decoding apparatus by the moving picture code conversion/reception apparatus, the amount of calculations required by the moving picture decoding apparatus is not greatly increased compared with ordinary moving picture decoding apparatus.

In the present embodiment, the code conversion/transmission apparatus and the code conversion/reception apparatus are used in combination with each other. However, no problem will arise if they are used independently of each other. The first to $N^{th}$ code conversion data may be transmitted in an interleaved fashion, rather than at spaced time intervals.

(9) Ninth Embodiment

According to an eighth embodiment of the present invention, a code conversion/transmission apparatus side, where N represents an integer of 2 or more and M represents an integer of 1 or more, has:

(a) a first moving picture code converter/transmitter for being supplied with compressed encoded packet data, decoding at least a portion of the encoded packet data input thereto, performing compression coding of at least a portion of the data at a compression ratio equal to or higher than the input encoded data, and controlling transmission, with a predetermining transmitting means, of all the packets or packets which have adaptively been selected according to the nature of the input moving picture or predetermined rules;

(b) second to $N^{th}$ moving picture code converter/transmitters for decoding at least a portion of the input encoded packet data, performing compression encoding of the data into packet data at a compression ratio equal to or higher than the first moving picture code converter/transmitter, and controlling transmission, with a predetermined transmitting means, of all the packet data that are obtained or packet data which have adaptively been selected according to the nature of the input moving picture or predetermined rules, with constant or adaptively changing transmission time differences; and (c) a mechanism for selecting compression ratios of first to $N^{th}$ moving picture code converter/transmitters and/or the number of encoded data to be transmitted depending on bands that can be used by first to $M^{th}$ transmission paths, and transmitting the encoded data to the first to $M^{th}$ transmission paths.

The code conversion/reception apparatus side comprises a selector for selecting at least one transmission path from the M transmission paths, receiving N encoded data from the selected transmission path, and selecting and outputting encoded packet data of good image quality, which has the lowest compression ratio, for example, from the packet data that are received free of transmission errors or losses which are produced by encoding an image in the same area of the same frame.

The components of the code conversion/transmission apparatus and the code conversion/reception apparatus have their processing and function realized by a program that is executable by a computer serving as the code conversion/transmission apparatus and the code conversion/reception apparatus.

The ninth embodiment will be described in greater detail below:

(9.A) General:

An arrangement and operation according to the present embodiment are substantially the same as those according to the eighth embodiment. As shown in FIG. 14, the system comprises a moving picture code conversion/transmission apparatus, a code conversion/reception apparatus, and transmission paths for transmitting encoded data. The integer N represents the number of encoded data transmitted by the code conversion/transmission apparatus, and is 2 or more. The integer M represents the number of transmission-paths to which N encoded data are sent, and is 1 or more.

The moving picture code conversion/transmission apparatus has an arrangement which is substantially the same as that of the eighth embodiment, but slightly differs therefrom as to operation of various components of the apparatus. Only the differences with the eighth embodiment will be described below.

A moving picture code conversion/transmission processor decodes at least a portion of encoded moving picture data input thereto, performs a predetermined compression encoding process of the obtained image at a compression ratio equal to or higher than the input image data, and transmits the code conversion data to the moving picture code conversion/reception apparatus. Encoded data of an input frame image that is encoded by the moving picture code conversion/transmission processor comprise one or plural packet data, each packet data including encoded interframe predictive parameters and encoded compressed differential image data with respect to an image area included in the input frame image. Second to $N^{th}$ moving picture encoder/transmitters encode an image area included in at least one of packets that have been encoded by the first moving picture encoder/transmitter, at a compression ratio equal to or higher than the first moving picture encoder/transmitter, and transmit the obtained encoded packet data to the moving picture code conversion/reception apparatus.

The moving picture code conversion/reception apparatus has an arrangement which is also substantially the same as that of the eighth embodiment, but slightly differs therefrom as to operation of various components of the apparatus. Only the differences with the eighth embodiment will be described below.

As with the case of the eighth embodiment, encoded data reconstructor 1410 selects packets of good image quality, which has the lowest compression ratio, for example, as encoded data to be decoded, from a maximum of N encoded packet data which have been received free of transmission errors and losses by the first to $N^{th}$ encoded data receivers and which include compressed data in the same area of the same frame. Encoded data reconstructor 1410 performs the selection on each packet data transmitted by the code conversion/transmission apparatus.

(9.B) Code Conversion/transmission Apparatus:

An arrangement and operation of the moving picture code conversion/transmission apparatus according to the present embodiment are substantially the same as those of the moving picture code conversion/transmission apparatus according to the eighth embodiment shown in FIG. 15, except that only operation of first encoded packet generator 1502, second encoded packet generator 1504, first error detecting code added frame/packet number adder 1503, and second error detecting code added frame/packet number adder 1505 is different. Only the differences will be described below.

In the moving picture data code conversion/transmission apparatus according to the present embodiment, first encoded packet generator 1502 and second encoded packet generator 1504 generate encoded packet data such that an image area included in encoded packet data generated by first encoded packet generator 1502 and an image area includes in encoded packet data generated by second encoded packet generator 1504 coincide with each other.

A preferred specific example of the present embodiment described above is the same as that of the second embodiment described above. An arrangement and operation of the moving picture code conversion/reception apparatus are the same as those of the fourth embodiment.

(9. C) Advantages:

According to the ninth embodiment, the moving picture code conversion/transmission apparatus decodes at least a portion of moving picture data input thereto, encodes the same moving picture data into two encoded data, and transmits the encoded data with time differences that are constant or adaptively changed.

The second moving picture code converter/transmitter encodes image information included in packets encoded by the first moving picture code converter/transmitter. The code conversion/transmission apparatus side selects and outputs encoded data of good image quality, which has the lowest compression ratio, in terms of packets from the encoded data that have been received normally.

As a result, even if transmission paths which tend to suffer frequent transmission errors and packet losses of highly burst nature and are low in reliability are employed, the probability that both of the two encoded data are transmitted in error is reduced, preventing a decoded image produced after the data transmission from being significantly corrupted.

By increasing the compression ratio of the second encoded data, it is possible to reduce an increase in the transmission band owing to the transmission of the second encoded data.

In addition, the first and second encoded data can be transmitted to a plurality of transmission paths having different bands, depending on the situation of the transmission paths and the intention of the moving picture sender or the moving picture recipient, and the influence of errors in the transmission paths can be reduced.

Furthermore, since at least one of the received two encoded data is selected by the moving picture code conversion/reception apparatus and output to the moving picture decoding apparatus by the moving picture code conversion/reception apparatus, the amount of calculations required by the moving picture decoding apparatus is not greatly increased compared with ordinary moving picture decoding apparatus.

In the present embodiment, the code conversion/transmission apparatus and the code conversion/reception apparatus are used in combination with each other. However, no problem will arise if they are used independently of each other. The first to $N^{th}$ code conversion data may be transmitted in an interleaved fashion, rather than at spaced time intervals. The first to $N^{th}$ code conversion data may be shuffled in their sequence according to an interleaving process such that $m^{th}$ encoded data may be transmitted subsequently to $n^{th}$ encoded data (m<n). The first to $N^{th}$ code conversion data may be multiplexed by a multiplexer and then transmitted, or may be transmitted parallel to each other.

According to a modification of each of the above embodiments, delay adders 502, 503 or delay adders 506, 507, shown in FIG. 5, for delaying the second to $N^{th}$ encoded moving picture data from the second to $N^{th}$ moving picture code converter/transmitters of the moving picture code conversion/transmission apparatus, and multiplexers 504, 508, shown in FIG. 5, for multiplexing the first encoded moving picture data output from the first moving picture code converter/transmitter and the second to $N^{th}$ encoded moving picture data to which delays have been added, may be provided in the moving picture code conversion/transmission apparatus. Alternatively, instead of providing the delay adders, an arrangement for multiplexers 504, 508 to interleave, multiplex, and output the first to $N^{th}$ encoded moving picture data from the first to $N^{th}$ moving picture code converter/transmitters of the moving picture code conversion/transmission apparatus may be provided in the moving picture code conversion/transmission apparatus. Each of M transmission paths 130 (see FIG. 1) may comprise the same communication medium or may include different mediums such as wireless and wired mediums.

(10) Tenth Embodiment

Figure 16:
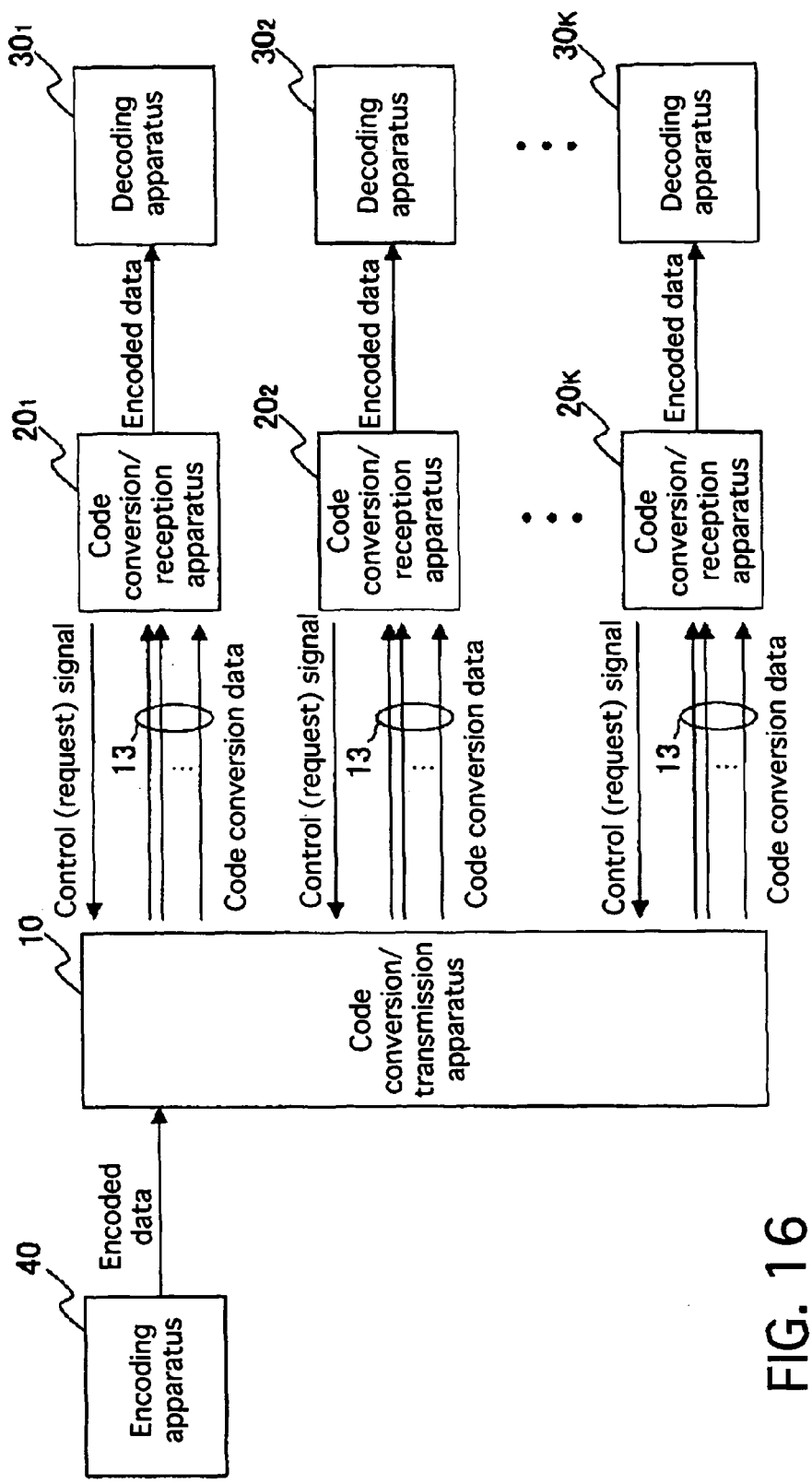
FIG. 16 is a block diagram illustrating a system arrangement according to a tenth embodiment of the present invention.

Another embodiment of the present invention will be described below. FIG. 16 shows a system arrangement of a tenth embodiment of the present invention. As shown in FIG. 16, the system comprises encoding apparatus 40 for outputting encoded data, code conversion/transmission apparatus 10 for moving picture data, a plurality of (K) code conversion/reception apparatus $20_1$ to $20_K$ for moving picture data, and a plurality of (K) decoding apparatus $30_1$ to $30_K$ connected to code conversion/reception apparatus $20_1$ to $20_K$. Encoding apparatus 40 serves as an information source for distributing encoded data, and comprises a known server apparatus. Code conversion/transmission apparatus 10 comprises any of the code conversion/transmission apparatus according to the present invention which have been described above with respect to the first to ninth embodiments, e.g., code conversion/transmission apparatus 100 shown in FIG. 1.

Each of plural code conversion/reception apparatus 20 for moving picture data comprises any of the code conversion/reception apparatus according to the present invention which have been described above with respect to the first to ninth embodiments, e.g., code conversion/reception apparatus 120 shown in FIG. 1. Decoding apparatus 30 are apparatus (decoders) for decoding and displaying encoded data from code conversion/reception apparatus 20, and comprise existing products.

In the embodiment shown in FIG. 16, transmission paths 13 used for transferring information between code conversion/transmission apparatus 10 and code conversion/reception apparatus $20_1$ to $20_K$ are assigned one to each of the code conversion/reception apparatus. That is, M is 1 for the M transmission paths 130 in the embodiment shown in FIG. 1, and a plurality of code conversion/reception apparatus 120 shown in FIG. 1 are provided. Code conversion/transmission apparatus 10 has N moving picture code converter/transmitters, not shown, and outputs N encoded data, in the same manner as with each of the above embodiments.

In a specific example of the present embodiment, code conversion/transmission apparatus 10 is connected to an Internet communication network (or an intranet), and encoding apparatus 40 inputs encoded data transmitted according to the UDP/IP protocol, for example, to code conversion/transmission apparatus 10. The non-illustrated moving picture code converter/transmitters of code conversion/transmission apparatus 10 perform a processing operation according to the RTP (Real-Time Transport Protocol). Code conversion/reception apparatus 20 serve as client terminals connected to the Internet communication network, for example.

If the transmission paths are wireless in the present embodiment, then a code conversion output from code conversion/transmission apparatus 10 is supplied via the UDP/IP protocol and a physical layer, and transmitted to a router and a gateway, etc. via a base station in a mobile packet communication system network to code conversion/reception apparatus 20 as a destination. In code conversion/reception apparatus 20, data whose code is converted by code conversion/transmission apparatus 10 between encoding apparatus 40 and decoding apparatus 30 are reconstructed into encoded data corresponding to the original encoded data in encoding apparatus 40, and are output. Decoding apparatus 30 decode the encoded data according to a process corresponding to the encoding process performed by encoding apparatus 40, and display a moving picture on display apparatus, not shown. Decoding apparatus (decoders) 30 connected to code conversion/reception apparatus 20 may be provided as terminals integral with code conversion/reception apparatus 20 or may provided in terminals (personal computers) connected for communications to terminals serving as code conversion/reception apparatus 20.

In the present embodiment, code conversion/reception apparatus 20 are arranged to output control signals (request signals) to code conversion/transmission apparatus 10. In response to the control signals, code conversion/transmission apparatus 10 transmits encoded data to code conversion/reception apparatus 20. FIG. 16 shows that the control signals are different from encoded data output from code conversion/transmission apparatus 10.

Using the control signals transmitted from code conversion/reception apparatus 20 side to code conversion/transmission apparatus 10, system information of code conversion/reception apparatus 20, e.g., IP addresses, apparatus information, information about an encoding scheme (e.g., H.261 or H263 of ITU-T recommendations or MPEG-4 Visual of ISO/IEC recommendations) compatible with decoding apparatus 30, etc. may be indicated to code conversion/transmission apparatus 10, so that code conversion/transmission apparatus 10 can perform an encoding and converting process which matches code conversion/reception apparatus 20 and decoding apparatus 30 in response to the request signals. The present invention is also applicable where the transmission paths are wired transmission paths.

In the arrangement shown in FIG. 16, the plural (N) encoded data output from code conversion/transmission apparatus 10 respectively to transmission paths 13 may be spaced at time intervals by delay adders and multiplexed by a multiplexer, as shown in FIG. 5. Alternatively, the N encoded data may be interleaved by a multiplexer so as to be shuffled in their transmission sequence, and sent as a multiplexed output to the transmission paths with time differences. The delay adders and the multiplexers shown in FIG. 5 may be provided in code conversion/transmission apparatus 10. In such a case, code conversion/reception apparatus 20 have separator 511 shown in FIG. 5. Multiplexed transmission packets received from the transmission path selected by the receiving transmission path selector are separated into packets of respective encoded data, from which encoded data are extracted and reconstructed. According to the present example, encoded data from encoding apparatus 40 as the information source are received by code conversion/transmission apparatus 10, and code conversion/transmission apparatus 10 converts the data into a form resistant to data losses and data errors over transmission paths 13 and transmits the data to code conversion/reception apparatus 20 side. Encoded data can thus be transmitted efficiently in a manner suitable for the transmission over transmission paths 13. Decoding apparatus 30 perform a decoding process corresponding to the encoding process performed by encoding apparatus 40.

While the present invention has been described with respect to the above embodiment, the present invention is not limited to the arrangements of the above embodiments, but various modifications and changes may be made by those skilled in the art without departing from the scope of the inventions described in the claims for patent.

The invention claimed is:

1. A code conversion and transmission apparatus for moving picture data, comprising:
    (a) first moving picture code converting and transmitting means for being supplied with compressed encoded data input thereto and outputting at least one frame of the input encoded data;
    (b) second to $N^{th}$ moving picture code converting and transmitting means, where N is an integer of 2 or more, for decoding at least a portion of the input encoded data, encoding the data obtained by the decoding, and outputting at least one frame of the encoded data thus obtained;
    (c) means for sending at least one of outputs from said first to $N^{th}$ moving picture code converting and transmitting means to first to $M^{th}$ transmission paths, where M is an integer of 1 or more, and
    (d) means for controlling outputs of said second to $N^{th}$ moving picture code converting and transmitting means and an output of said first moving picture code converting and transmitting means so as to be outputted with time differences, or outputted to each of said first to $N^{th}$ moving picture code converting and transmitting means with time differences.

2. The code conversion and transmission apparatus according to claim 1 wherein at least one of said first to $N^{th}$ moving picture code converting and transmitting means selects at least one frame according to the nature of moving pictures or predetermined rules.

3. The code conversion and transmission apparatus according to claim 1, wherein, when said second to $N^{th}$ moving picture code converting and transmitting means decode said input encoded data and encode the data obtained by the decoding, said second to $N^{th}$ moving picture code converting and transmitting means compress the data at a compression ratio equal to or higher than the compression ratio of said input encoded data.

4. The code conversion and transmission apparatus according to claim 1, wherein the time differences for the outputs of said first to $N^{th}$ moving picture code converting and transmitting means are established according to the state of at least one of the transmission paths and predetermined rules.

5. The code conversion and transmission apparatus according to claim 1, comprising means for selecting compression ratios of said first to $N^{th}$ moving picture code converting and transmitting means and/or the number of encoded data to be transmitted depending on bands that can be used by said first to $M^{th}$ transmission paths, and sending the data to said first to $M^{th}$ transmission paths.

6. The code conversion and transmission apparatus according to claim 1, comprising:
    first to $M^{th}$ code conversion and transmission processors each having said first to $N^{th}$ moving picture code converting and transmitting means, wherein outputs of said first to $M^{th}$ code conversion and transmission processors are sent respectively to said first to $M^{th}$ transmission paths.

7. A code conversion and transmission apparatus for moving picture data, comprising:
  (a) first moving picture code converting and transmitting means for being supplied with compressed encoded data input thereto and outputting at least one frame of the input encoded data;
  (b) second to the $N^{th}$ moving picture code converting and transmitting means, where N is an integer of 2 or more, for decoding at least a portion of the input encoded data, encoding the data obtained by the decoding, and outputting at least one frame of the encoded data thus obtained;
  (c) means for sending at least one of outputs from said first to the $N^{th}$ moving picture code converting and transmitting means to the first $M^{th}$ transmission paths, where M is an integer of 1 or more,
  (d) first to $M^{th}$ code conversion and transmission processors each having said first to $N^{th}$ moving picture code converting and transmitting means; and
  (e) means for multiplexing and outputting first to $N^{th}$ encoded data outputs of said first to $N^{th}$ moving picture code converting and transmitting means of said first to $M^{th}$ code conversion and transmission processors, with time differences;
  wherein multiplexed outputs of said first to $M^{th}$ code conversion and transmission processors are sent respectively to said first to $M^{th}$ transmission paths.

8. The code conversion and transmission apparatus according to claim 7, wherein the time differences set for the outputs of said first to $N^{th}$ moving picture code converting and transmitting means are multiplexed are according to the state of at least one of the transmission paths and predetermined rules.

9. The code conversion and transmission apparatus according to claim 1, comprising:
  moving picture decoding means for decoding and outputting said input encoded data, said moving picture decoding means being shared by a plurality of moving picture code converting and transmitting means of said first to $N^{th}$ moving picture code converting and transmitting means;
  wherein said plurality of moving picture code converting and transmitting means encode decoded data output from said moving picture decoding means upon the encoding of encoded data.

10. A code conversion and transmission system for moving picture data, comprising:
  a code conversion and transmission apparatus; and
  a code conversion/reception apparatus,
  wherein said code conversion and transmission apparatus comprises:
  (a) first moving picture code converting and transmitting means for being supplied with compressed encoded data input thereto and outputting at least one frame of the input encoded data;
  (b) second to the $N^{th}$ moving picture code converting and transmitting means, where N is an integer of 2 or more, for decoding at least a portion of the input encoded data, encoding the data obtained by decoding, and outputting at least one frame of the encoded data thus obtained;
  (c) means for sending at least one of outputs from said first to the Nth moving picture code converting and transmitting means to first to $M^{th}$ transmission paths, where M is a n integer of 1 or more, and
  (d) means for controlling delays, multiplexing the data, and outputting the multiplexed data such that the outputs of said first to $N^{th}$ moving picture code converting and transmitting means of said code apparatus for moving picture data are transmitted with time differences,
  wherein said code conversion/reception apparatus comprises:
  selecting means for selecting a transmission path for receiving encoded data from first to $M^{th}$ transmission paths where M is an integer of 1 or more; and
  means for receiving encoded data from the transmission path selected by said selecting means, extracting encoded data which are received free of transmission errors and losses, and reconstructing encoded data based on the extracted encoded data and outputting the reconstructed encoded data, and
  wherein the multiplexed data are transmitted to the transmission paths.

11. The code conversion and transmission system according to claim 10 wherein said time differences for the outputs of said first to $N^{th}$ moving picture code converting and transmitting means of said code conversion and transmission apparatus for moving picture data are established according to the state of at least one of the transmission paths and predetermined rules.

12. A code conversion and transmission system for moving picture data, comprising:
  an encoding apparatus for outputting encoded data;
  a code conversion and transmission apparatus according to claim 1;
  a plurality of code conversion/reception apparatus; and
  a plurality of decoding apparatus;
  wherein the encoded data from said encoding apparatus are input to said code conversion and transmission apparatus for moving picture data;
  said plurality of code conversion/reception apparatus are supplied with the output from said code conversion and transmission apparatus for moving picture data;
  said plurality of decoding apparatus are supplied with and decode encoded data from said plurality of code conversion/reception apparatus for moving picture data; and
  said plurality of code conversion/reception apparatus comprise:
  selecting means for selecting a transmission path for receiving encoded data from first to $M^{th}$ transmission paths where M is an integer of 1 or more; and
  means for receiving encoded data from the transmission path selected by said selecting means, extracting encoded data which are received free of transmission errors and losses, and reconstructing encoded data based on the extracted encoded data and outputting the reconstructed encoded data.

13. The code conversion and transmission system according to claim 12, wherein said code conversion and transmission apparatus for moving picture data transmits the encoded data to said plurality of code conversion/reception apparatus for moving picture data in response to control signals respectively from said plurality of code conversion/reception apparatus for moving picture data.

14. A code conversion and transmission method for moving picture data, which is carried out by a code conversion and transmission apparatus having first to $N^{th}$ moving picture code converting and transmitting means, where N is an integer of 2 or more, comprising the steps of:
  (a) causing said first moving picture code converting and transmitting means to be supplied with compressed encoded data input thereto and output at least one frame of the input encoded data;

(b) causing said second to N$^{th}$ moving picture code converting and transmitting means to encode data produced by decoding at least a portion of the input encoded data, and output at least one frame of the encoded data thus obtained; and (c) sending at least one of outputs from said first to N$^{th}$ moving picture code converting and transmitting means to first to M$^{th}$ transmission paths, where M is an integer of 1 or more, wherein outputs of said second to N$^{th}$ moving picture code converting and transmitting means in said step (b) and an output in said step (a) are outputted with time differences, and/or respective outputs in said step (b) are outputted with time differences.

15. The code conversion and transmission method according to claim 14, wherein at least one frame is selected according to the nature of moving pictures or predetermined rules.

16. The code conversion and transmission method according to claim 14, wherein in said step (b), when said second to N$^{th}$ moving picture code means decode said input encoded data and encode the data obtained by the decoding, said second to N$^{th}$ moving picture code converting and transmitting means compress the data at a compression ratio equal to or higher than the compression ratio of said input encoded data.

17. The code conversion and transmission method according to claim 14, wherein the time differences for the outputs of said moving picture code converting and transmitting means are established according to the state of at least one of the transmission paths and predetermined rules.

18. The code conversion and transmission method according to claim 14, wherein compression ratios of said first to N$^{th}$ moving picture code converting and transmitting means and/or the number of encoded data to be transmitted is selected depending on bands that can be used by said first to M$^{th}$ transmission paths, and the data are sent to said first to M$^{th}$ transmission paths.

19. The code conversion and transmission method according to claim 14, wherein a plurality of moving picture code converting and transmitting means for encoding data produced by decoding moving picture data, of said first to N$^{th}$ moving picture code converting and transmitting means, are supplied with data which is obtained by decoding in common moving picture decoding means.

20. A code transmission method for moving picture data, comprising the step of receiving encoded data transmitted by a code conversion and transmission method according to claim 14, and a code conversion/reception method comprising the steps of:

selecting at least one transmission path from M transmission paths where M is an integer of 1 or more; and receiving encoded data from the selected transmission path, extracting encoded data which are received free of transmission errors and losses, and reconstructing encoded data based on the extracted encoded data and outputting the reconstructed encoded data.

21. The code conversion and transmission system according to claim 10, wherein said code conversion/reception apparatus further comprises means for selecting one of encoded data in the same frame which is received from said selected transmission path based on at least one of a compression ratio and image quality.

22. The code conversion and transmission system according to claim 12, further comprising means for selecting one of encoded data in the same frame which is received from said selected transmission path based on at least one of a compression ratio and image quality.

23. The code transmission method according to claim 20, wherein if a plurality of encoded data in the same frame are received, one of the encoded data is selected based on at least one of a compression ratio and image quality.

24. The code transmission method according to claim 20, for enabling a computer to function as moving picture decoding means, shared by a plurality of moving picture code converting and transmitting means for encoding data produced by encoding moving picture data, of said first to N$^{th}$ moving picture code converting/transmitting means, for decoding moving picture data input thereto and supplying the decoded data to said plurality of moving picture code converting and transmitting means.

* * * * *

UNITED STATES PATENT AND TRADEMARK OFFICE
CERTIFICATE OF CORRECTION

| | | |
|---|---|---|
| PATENT NO. | : 7,957,465 B2 | Page 1 of 1 |
| APPLICATION NO. | : 10/512458 | |
| DATED | : June 7, 2011 | |
| INVENTOR(S) | : Hiroaki Dei et al. | |

It is certified that error appears in the above-identified patent and that said Letters Patent is hereby corrected as shown below:

In the Claims

Column 52, Line 2: In Claim 10, after "code" insert -- conversion/transmission --.

Column 53, Line 9: In Claim 14, delete "where M is an integer of 1 or more," and insert the same on Col. 53, Line 8 after "paths," as continuation paragraph.

Column 53, Line 20: In Claim 16, after "code" insert -- converting and transmitting --.

Signed and Sealed this
Eighteenth Day of March, 2014

Michelle K. Lee
*Deputy Director of the United States Patent and Trademark Office*